US008983842B2

(12) United States Patent
Ikeda et al.

(10) Patent No.: US 8,983,842 B2
(45) Date of Patent: Mar. 17, 2015

(54) APPARATUS, PROCESS, AND PROGRAM FOR COMBINING SPEECH AND AUDIO DATA

(75) Inventors: Tetsuo Ikeda, Tokyo (JP); Ken Miyashita, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/855,621

(22) Filed: Aug. 12, 2010

(65) Prior Publication Data

US 2011/0046955 A1 Feb. 24, 2011

(30) Foreign Application Priority Data

Aug. 21, 2009 (JP) ................................ P2009-192399

(51) Int. Cl.
*G10L 15/00* (2013.01)
*G10L 13/00* (2006.01)
*G10L 13/08* (2013.01)

(52) U.S. Cl.
CPC ...................................... *G10L 13/08* (2013.01)
USPC ................ 704/260; 704/267; 369/96; 84/610

(58) Field of Classification Search
CPC ....... G10L 13/08; G10L 13/043; G10L 21/04; G10L 19/005; G10L 15/12; G10L 15/08; G10L 13/04; G10L 19/022; G10L 19/018; G10L 21/01; H05K 999/99; H04B 1/667; G11B 20/10527; G11B 27/005; G11B 7/00; G11B 7/14; G11B 20/1403; G11B 27/3027; G11B 20/10009; G11B 7/0053; A61M 21/00; A61M 2021/0027; G10K 15/10; G10H 1/366; G10H 1/36; G10H 1/38; G10H 2210/175; G10H 1/30; G10H 2210/616; G10H 2210/011; G10H 1/40; G10H 1/42
USPC ......... 704/260, 211, 212, 241, 242, 263, 267, 704/503, E15.016, E21.016, E19.011, 704/E21.017, E21.018; 369/96, 95, 47.28, 369/53.34, 60.01; 84/610, 712, 666, 650, 84/634, 635, 651, 667, 713, 611
See application file for complete search history.

(56) References Cited

U.S. PATENT DOCUMENTS

| | | | |
|---|---|---|---|
| 7,714,222 B2 * | 5/2010 | Taub et al. | ...................... 84/600 |
| 2001/0027396 A1 | 10/2001 | Sato | |

(Continued)

FOREIGN PATENT DOCUMENTS

| | | |
|---|---|---|
| EP | 1 909 263 A1 | 4/2008 |
| JP | 10-104010 | 4/1998 |

OTHER PUBLICATIONS

European Search Report from the European Patent Office for EP 10 16 8323 (Date of Completion; Jan. 7, 2011).

*Primary Examiner* — Daniel D Abebe
(74) *Attorney, Agent, or Firm* — Finnegan, Henderson, Farabow, Garrett & Dunner, L.L.P.

(57) ABSTRACT

There is provided a speech processing apparatus including: a data obtaining unit which obtains music progression data defining a property of one or more time points or one or more time periods along progression of music; a determining unit which determines an output time point at which a speech is to be output during reproducing the music by utilizing the music progression data obtained by the data obtaining unit; and an audio output unit which outputs the speech at the output time point determined by the determining unit during reproducing the music.

12 Claims, 24 Drawing Sheets

(56) References Cited

U.S. PATENT DOCUMENTS

| | | | | |
|---|---|---|---|---|
| 2002/0087224 | A1* | 7/2002 | Barile | 700/94 |
| 2002/0133349 | A1* | 9/2002 | Barile | 704/265 |
| 2004/0039796 | A1* | 2/2004 | Watkins | 709/218 |
| 2004/0210439 | A1* | 10/2004 | Schrocter | 704/260 |
| 2005/0143915 | A1* | 6/2005 | Odagawa et al. | 701/211 |
| 2006/0074649 | A1* | 4/2006 | Pachet et al. | 704/229 |
| 2006/0086236 | A1* | 4/2006 | Ruby | 84/612 |
| 2006/0185504 | A1* | 8/2006 | Kobayashi | 84/645 |
| 2007/0094028 | A1 | 4/2007 | Lu et al. | |
| 2007/0186752 | A1* | 8/2007 | Georges et al. | 84/609 |
| 2007/0250597 | A1* | 10/2007 | Resner et al. | 709/218 |
| 2007/0260460 | A1* | 11/2007 | Hyatt | 704/260 |
| 2007/0261535 | A1* | 11/2007 | Sherwani et al. | 84/609 |
| 2009/0070114 | A1 | 3/2009 | Staszak | |
| 2009/0076821 | A1* | 3/2009 | Brenner et al. | 704/260 |
| 2009/0306960 | A1* | 12/2009 | Katsumata | 704/8 |
| 2009/0306985 | A1 | 12/2009 | Roberts et al. | |
| 2009/0326949 | A1* | 12/2009 | Douthitt et al. | 704/260 |
| 2010/0031804 | A1* | 2/2010 | Chevreau et al. | 84/609 |
| 2010/0036666 | A1* | 2/2010 | Ampunan et al. | 704/251 |

* cited by examiner

FIG.2

ATTRIBUTE DATA (ATT)

| | | | |
|---|---|---|---|
| 1 | TITLE | XXXXXXX | OBTAIN FROM TOC, PLAYLIST ETC. |
| 2 | ARTIST NAME | XXXXXXX | |
| 3 | GENRE | XXXXXXX | |
| 4 | LENGTH | hh:mm:ss | |
| 5 | ORDINAL POSITION | nTH | |
| : | : | : | |
| 6 | WEEKLY RANKING | NN | OBTAIN FROM EXTERNAL DATABASE |
| 7 | MONTHLY RANKING | NN | |
| : | : | : | |

FIG.3

MUSIC PROGRESSION DATA (MP)

GENERIC DATA (GD)

| | | |
|---|---|---|
| 1 | MOOD | CHEERFUL, LONELY |
| 2 | BPM | ♪ = NNN |
| 3 | : | : |

1

1...*

TIMELINE DATA (TL)

| | | |
|---|---|---|
| 1 | POSITION | NNNNN |
| 2 | CATEGORY | MELODY, CODE, KEY, BEAT, INSTRUMENT |
| 3 | SUBCATEGORY | MELODY, CODE, KEY, BEAT, OR TYPE OF INSTRUMENT ETC. |

FIG.8

REPRODUCTION HISTORY DATA (HIST)

HIST1

| MUSIC ID | DATE AND TIME |
|---|---|
| M001 | YYYYMMDDhhmmss |
| M123 | YYYYMMDDhhmmss |
| M001 | YYYYMMDDhhmmss |
| M200 | YYYYMMDDhhmmss |
| : | : |

⇨

HIST2

| MUSIC ID | NUMBER OF REPRODUCTION |
|---|---|
| M001 | 10 |
| M002 | 1 |
| : | : |
| M123 | 5 |
| : | : |

APPARATUS, PROCESS, AND PROGRAM FOR COMBINING SPEECH AND AUDIO DATA

BACKGROUND OF THE INVENTION

1. Field of the Invention

The present invention relates to a speech processing apparatus, a speech processing method and a program.

2. Description of the Related Art

In recent years, an increasing number of users store digitalized music data to a personal computer (PC) and a portable audio player and enjoy by reproducing music from the stored music data. Such music reproduction is performed in sequence based on a playlist having a tabulated music data. When music is reproduced simply in the same order all the time, there is a possibility that a user gets tired of music reproduction before long. Accordingly, some software for audio players has a function to perform music reproduction in the order selected from a playlist in random.

A navigation apparatus which automatically recognizes an interim of music and outputs navigation information as a speech at the interim has been disclosed in Japanese Patent Application Laid-Open No. 10-104010. The navigation apparatus can provide useful information to a user at an interim between music and other music of which reproduction is enjoyed by a user in addition to simply reproducing music.

SUMMARY OF THE INVENTION

The navigation apparatus disclosed in Japanese Patent Application Laid-Open No. 10-104010 is mainly targeted to insert navigation information not to overlap to music reproduction and is not targeted to change quality of experience of a user who enjoys music. If diverse speeches can be output not only at an interim but also at various time points along music progression, the quality of experience of a user can be improved for entertainment properties and realistic sensation.

In light of the foregoing, it is desirable to provide a novel and improved speech processing apparatus, a speech processing method and a program which are capable of outputting diverse speeches at various time points along music progression.

According to an embodiment of the present invention, there is provided a speech processing apparatus including: a data obtaining unit which obtains music progression data defining a property of one or more time points or one or more time periods along progression of music; a determining unit which determines an output time point at which a speech is to be output during reproducing the music by utilizing the music progression data obtained by the data obtaining unit; and an audio output unit which outputs the speech at the output time point determined by the determining unit during reproducing the music.

With above configuration, an output time point associated with any one of one or more time points or one or more time periods along music progression is dynamically determined and a speech is output at the output time point during music reproducing.

The data obtaining unit may further obtain timing data which defines output timing of the speech in association with any one of the one or more time points or the one or more time periods having a property defined by the music progressing data, and the determining unit may determine the output time point by utilizing the music progression data and the timing data.

The data obtaining unit may further obtain a template which defines content of the speech, and the speech processing apparatus may further include: a synthesizing unit which synthesizes the speech by utilizing the template obtained by the data obtaining unit.

The template may contain text data describing the content of the speech in a text format, and the text data may have a specific symbol which indicates a position where an attribute value of the music is to be inserted.

The data obtaining unit may further obtain attribute data indicating an attribute value of the music, and the synthesizing unit may synthesize the speech by utilizing the text data contained in the template after an attribute value of the music is inserted to a position indicated by the specific symbol in accordance with the attribute data obtained by the data obtaining unit.

The speech processing apparatus may further include: a memory unit which stores a plurality of the templates defined being associated respectively with any one of a plurality of themes relating to music reproduction, wherein the data obtaining unit may obtain one or more template corresponding to a specified theme from the plurality of templates stored at the memory unit.

At least one of the templates may contain the text data to which a title or an artist name of the music is inserted as the attribute value.

At least one of the templates may contain the text data to which the attribute value relating to ranking of the music is inserted.

The speech processing apparatus may further include: a history logging unit which logs history of music reproduction, wherein at least one of the templates may contain the text data to which the attribute value being set based on the history logged by the history logging unit is inserted.

At least one of the templates may contain the text data to which an attribute value being set based on music reproduction history of a listener of the music or a user being different from the listener is inserted.

The property of one or more time points or one or more time periods defined by the music progression data may contain at least one of presence of singing, a type of melody, presence of a beat, a type of a code, a type of a key and a type of a played instrument at the time point or the time period.

According to another embodiment of the present invention, there is provided a speech processing method utilizing a speech processing apparatus, including the steps of: obtaining music progression data which defines a property of one or more time points or one or more time periods along progression of music from a storage medium arranged at the inside or outside of the speech processing apparatus; determining an output time point at which a speech is to be output during reproducing the music by utilizing the obtained music progression data; and outputting the speech at the determined output time point during reproducing the music.

According to another embodiment of the present invention, there is provided a program for causing a computer for controlling a speech processing apparatus to function as: a data obtaining unit which obtains music progression data defining a property of one or more time points or one or more time periods along progression of music; a determining unit which determines an output time point at which a speech is to be output during reproducing the music by utilizing the music progression data obtained by the data obtaining unit; and an audio output unit which outputs the speech at the output time point determined by the determining unit during reproducing the music.

As described above, with a speech processing apparatus, a speech processing method and a program according to the present invention, diverse speeches can be output at various time points along music progression.

BRIEF DESCRIPTION OF THE DRAWINGS

FIG. 2 is an explanatory view which illustrates an example of attribute data;

FIG. 3 is a first explanatory view which illustrates an example of music progression data;

FIG. 8 is an explanatory view which illustrates an example of reproduction history data;

DETAILED DESCRIPTION OF THE EMBODIMENT(S)

Figure 1:
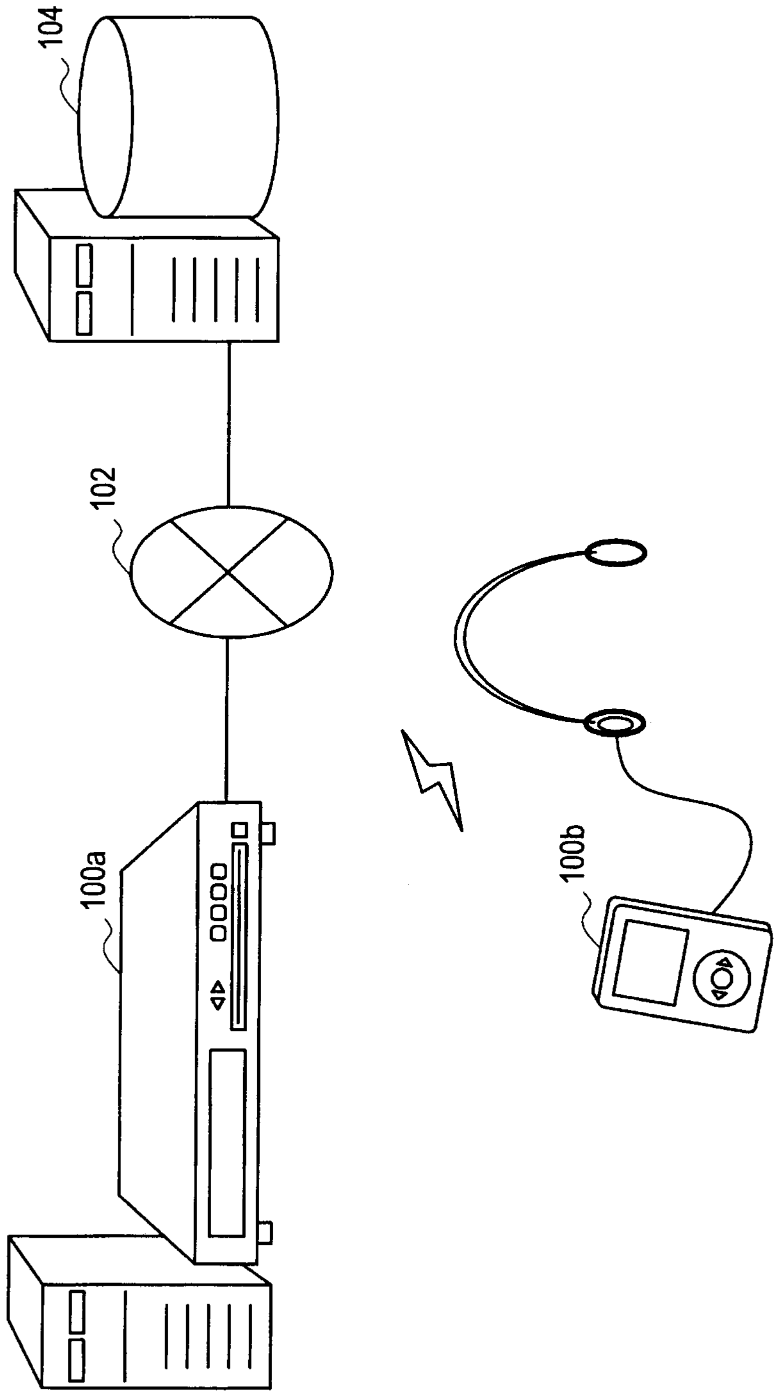
FIG. 1 is a schematic view which illustrates an outline of a speech processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention will be described in the following order.

1. Outline of speech processing apparatus
2. Description of data managed by speech processing apparatus
   2-1. Music data
   2-2. Attribute data
   2-3. Music progression data
   2-4. Theme, template and timing data
   2-5. Pronunciation description data
   2-6. Reproduction history data
3. Description of first embodiment
   3-1. Configuration example of speech processing apparatus
   3-2. Example of processing flow
   3-3. Example of theme
   3-4. Conclusion of first embodiment
4. Description of second embodiment
   4-1. Configuration example of speech processing apparatus
   4-2. Example of theme
   4-3. Conclusion of second embodiment
5. Description of third embodiment 5-1. Configuration example of speech processing apparatus
   5-2. Example of theme
   5-3. Conclusion of third embodiment 1. Outline of Speech Processing Apparatus First, an outline of a speech processing apparatus according to an embodiment of the present invention will be described with reference to FIG. 1. FIG. 1 is a schematic view illustrating the outline of the speech processing apparatus according to an embodiment of the present invention. FIG. 1 illustrates a speech processing apparatus 100*a*, a speech processing apparatus 100*b*, a network 102 and an external database 104.

The speech processing apparatus 100*a* is an example of the speech processing apparatus according to an embodiment of the present invention. For example, the speech processing apparatus 100*a* may be an information processing apparatus such as a PC and a work station, a digital household electrical appliance such as a digital audio player and a digital television receiver, a car navigation device or the like. Exemplarily, the speech processing apparatus 100*a* is capable of accessing the external database 104 via the network 102.

The speech processing apparatus 100*b* is also an example of the speech processing apparatus according to an embodiment of the present invention. Here, a portable audio player is illustrated as the speech processing apparatus 100*b*. For example, the speech processing apparatus 100*b* is capable of accessing the external database 104 by utilizing a wireless communication function.

The speech processing apparatus 100_a_ and 100_b_ reads out music data stored in an integrated or a detachably attachable storage medium and reproduces music, for example. The speech processing apparatus 100_a_ and 100_b_ may include a playlist function, for example. In this case, it is also possible to reproduce music in the order defined by a playlist. Further, as described in detail later, the speech processing apparatus 100_a_ and 100_b_ performs additional speech outputting at a variety of time points along progression of music to be reproduced. Content of a speech to be output by the speech processing apparatus 100_a_ and 100_b_ may be dynamically generated corresponding to a theme to be specified by a user or a system and/or in accordance with a music attribute.

Hereinafter, when it is not specifically required to be mutually distinguished, the speech processing apparatus 100_a_ and the speech processing apparatus 100_b_ are collectively called the speech processing apparatus 100 as abbreviating an alphabet at the tail end of each numeral in the following description of the present specification.

The network 102 is a communication network to connect the speech processing apparatus 100_a_ and the external database 104. For example, the network 102 may be an arbitrary communication network such as the Internet, a telephone communication network, an internet protocol-virtual private network (IP-VPN), a local area network (LAN) or and a wide area network (WAN). Further, it does not matter whether the network 102 is wired or wireless.

The external database 104 is a database to provide data to the speech processing apparatus 100 in response to a request from the speech processing apparatus 100. The data provided by the external database 104 includes a part of music attribute data, music progression data and pronunciation description data, for example. However, not limited to the above, other types of data may be provided from the external database 104. Further, the data which is described as being provided from the external database 104 in the present specification may be previously stored at the inside of the speech processing apparatus 100.

2. Description of Data Managed by Speech Processing Apparatus

Next, main data used by the speech processing apparatus 100 in an embodiment of the present invention will be described.

2-1. Music Data

Music data is the data obtained by encoding music into a digital form. The music data may be formed in an arbitrary format of compressed type or non-compressed type such as WAV, AIFF, MP3 and ATRAC. The attribute data and the music progression data which are described later are associated with the music data.

2-2. Attribute Data

In the present specification, the attribute data is the data to indicate music attribute values. FIG. 2 indicates an example of the attribute data. As indicated in FIG. 2, the attribute data (ATT) includes the data obtained from a table of content (TOC) of a compact disc (CD), an ID3 tag of MP3 or a playlist (hereinafter, called TOC data) and the data obtained from the external database 104 (hereinafter, called external data). Here, the TOC data includes a music title, an artist name, a genre, length, an ordinal position (i.e., a how-manieth music in a playlist) or the like. The external data may include the data indicating an ordinal number of the music in weekly or monthly ranking, for example. As described later, a value of such attribute data may be inserted to a predetermined position included in content of a speech to be output during music reproducing by the speech processing apparatus 100.

2-3. Music Progression Data

The music progression data is the data to define properties of one or more time points or one or more time periods along music progression. The music progression data is generated by analyzing the music data and, for example, is previously maintained at the external database 104. For example, the SMFMF format may be utilized as a data format of the music progression data. For example, compact disc database (CDDB, a registered trademark) of GraceNote (registered trademark) Inc. provides music progression data of a lot of music in the SMFMF format in the market. The speech processing apparatus 100 can utilize such data.

FIG. 3 illustrates an example of the music progression data described in the SMFMF format. As illustrated in FIG. 3, the music progression data (MP) includes generic data (GD) and timeline data (TL).

The generic data is the data to describe a property of the entire music. In the example of FIG. 3, the mood of music (i.e., cheerful, lonely etc.) and beats per minute (BPM: indicating the tempo of music) are illustrated as data items of the generic data. Such generic data may be treated as the music attribute data.

The timeline data is the data to describe properties of one or more time points or one or more time periods along music progression. In the example of FIG. 3, the timeline data includes three data items of "position", "category" and "subcategory". Here, "position" defines a certain time point along music progression by utilizing a time span (for example, in the order of msec etc.) having its start point at the time point of starting performance of music, for example. Meanwhile, "category" and "subcategory" indicate properties of music performed at the time point defined by "position" or the partial time period starting from the time point. More specifically, when "category" is "melody", for example, "subcategory" indicates a type (i.e., introduction, A-melody, B-melody, hook-line, bridge etc.) of the performed melody. When "category" is "code", for example, "subcategory" indicates a type of the performed code (i.e., CMaj, Cm, C7 etc.). When "category" is "beat", for example, "subcategory" indicates a type of the beat (i.e., large beat, small beat etc.) performed at the time point. When "category" is "instrument", for example, "subcategory" indicates a type of played instrument (i.e., guitar, base, drum, male vocalist, female vocalist etc.). Here, the classification of "category" and "subcategory" is not limited to such examples. For example, "male vocalist", "female vocalist" and the like may be in a subcategory belonging to a category (for example, "vocalist") defined to be different from the category of "instrument".

Figure 4:
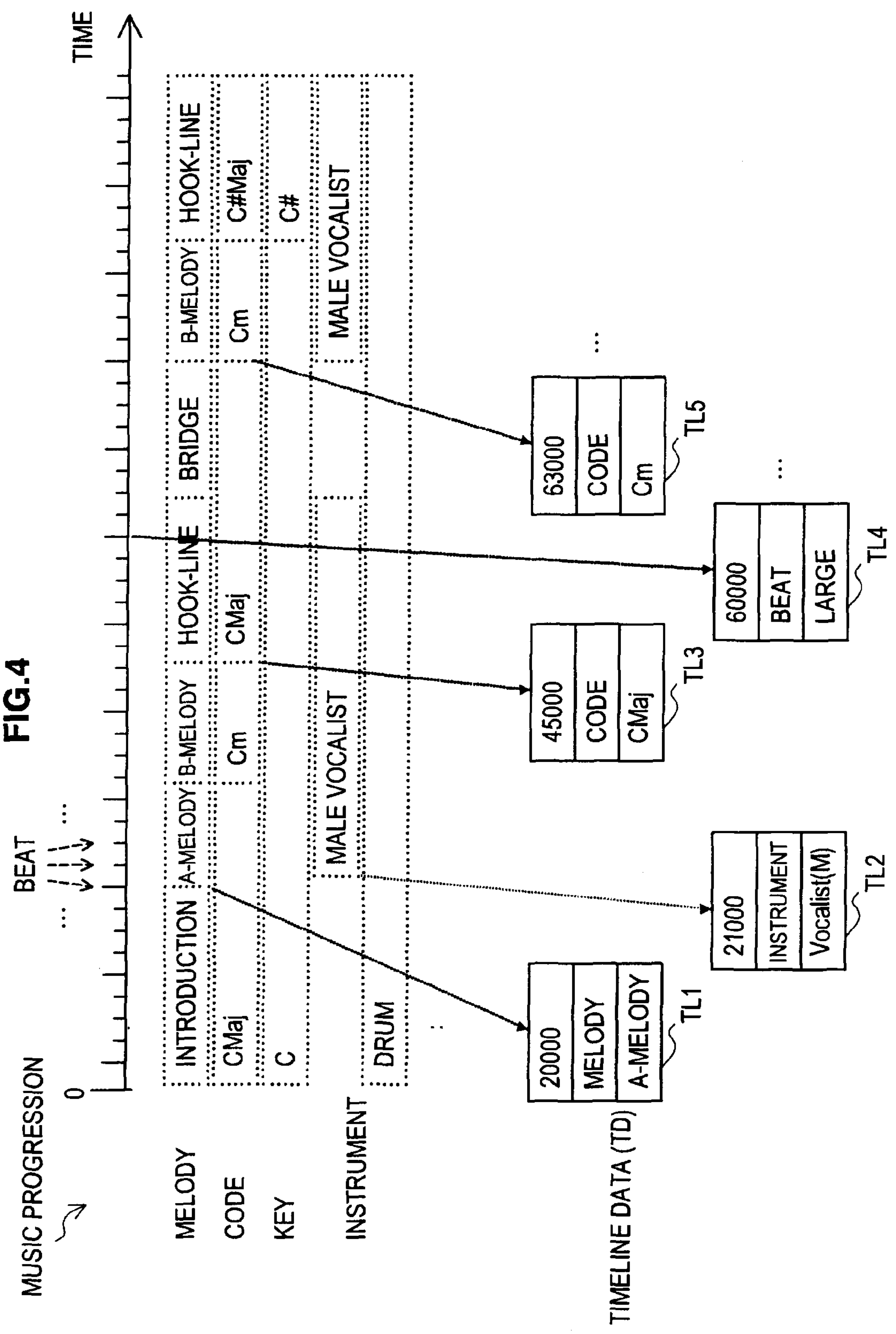
FIG. 4 is a second explanatory view which illustrates an example of music progression data.

FIG. 4 is an explanatory view further describing the timeline data among the music progression data. The upper part of FIG. 4 illustrates a performed melody type, a code type, a key type, an instrument type along progression of music with a time axis. For example, in the music of FIG. 4, the melody type progresses in the order of "introduction", "A-melody", B-melody", "hook-line", "bridge", "B-melody" and "hook-line". The code type progresses in the order of "CMaj", "Cm", "CMaj", "Cm" and "C#Maj". The key type progresses in the order of "C" and "C#". Further, a male vocalist appears at melody parts other than "introduction" and "bridge" (i.e., a male is singing in the periods). Furthermore, a drum is played along the entire music.

The lower part of FIG. 4 illustrates five timeline data TL1 to TL5 as an example along the above music progression. The timeline data TL1 indicates that the melody performed from position 20000 (i.e., the time point 20000 msec (=20 sec) after the time point of starting performance is "A-melody". The timeline data TL2 indicates that a male vocalist starts singing at position 21000. The timeline data TL3 indicates that the code of performance from position 45000 is "CMaj". The timeline data TL4 indicates that a large beat is performed at position 60000. The timeline TL5 indicates that the code of performance from position 63000 is "Cm".

By utilizing such music progression data, the speech processing apparatus 100 can recognize when vocals appear among one or more time points or one or more time periods along music progression (when a vocalist sings), recognize when what type of a melody, a code, a key or an instrument appears in the performance, or recognize when a beat is performed.

2-4. Theme, Template and Timing Data

Figure 5:
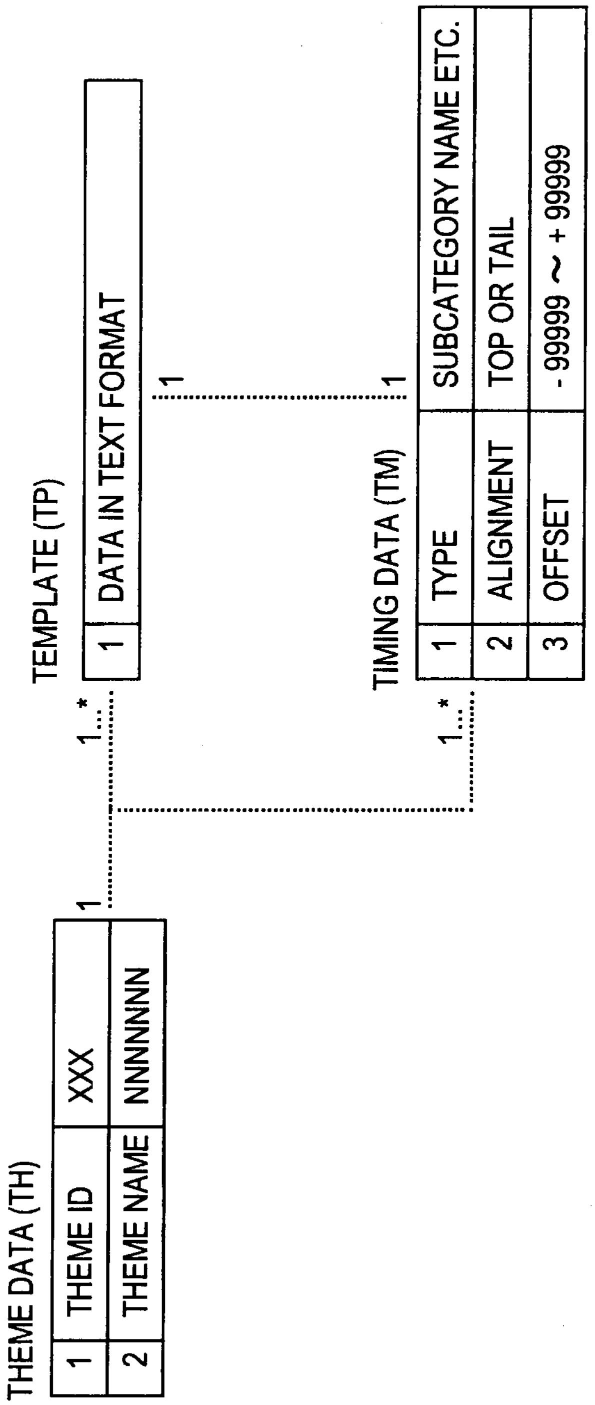
FIG. 5 is an explanatory view which illustrates relation among a theme, a template and timing data.

FIG. 5 is an explanatory view illustrating the relation among a theme, a template and timing data. As illustrated in FIG. 5, one or more templates (TP) and one or more timing data (TM) exist in association with one theme data (TH). That is, the template and the timing data are associated with any one of theme data. The theme data indicates a theme respectively relating to music reproduction and classifies plurally supplied pairs of templates and timing data into several groups. For example, the theme data includes two data items of a theme identifier (ID) and a theme name. Here, the theme ID is an identifier to uniquely identify respective themes. The theme name is a name of a theme used for selection of a desired theme from a plurality of themes by a user, for example.

The template is the data to define content of speech to be output during music reproducing. The template includes text data describing the content of a speech in a text format. For example, a speech synthesizing engine reads out the text data, so that the content defined by the template is converted into a speech. Further, as described later, the text data includes a specific symbol indicating a position where an attribute value contained in music attribute data is to be inserted.

The timing data is the data to define output timing of a speech to be output during music reproducing in association with either one or more time points or one or more time periods recognized from the music progression data. For example, the timing data includes three data items of a type, an alignment and an offset. Here, for example, the type is used for specifying at least one timeline data including reference to a category or a subcategory of the timeline data of the music progression data. Further, the alignment and the offset define a position on the time axis indicated by the timeline data specified by the type and the positional relation relatively with speech output time point. In the description of the present embodiment, one timing data is provided to one template. Instead, plural timing data may be provided to one template.

Figure 6:
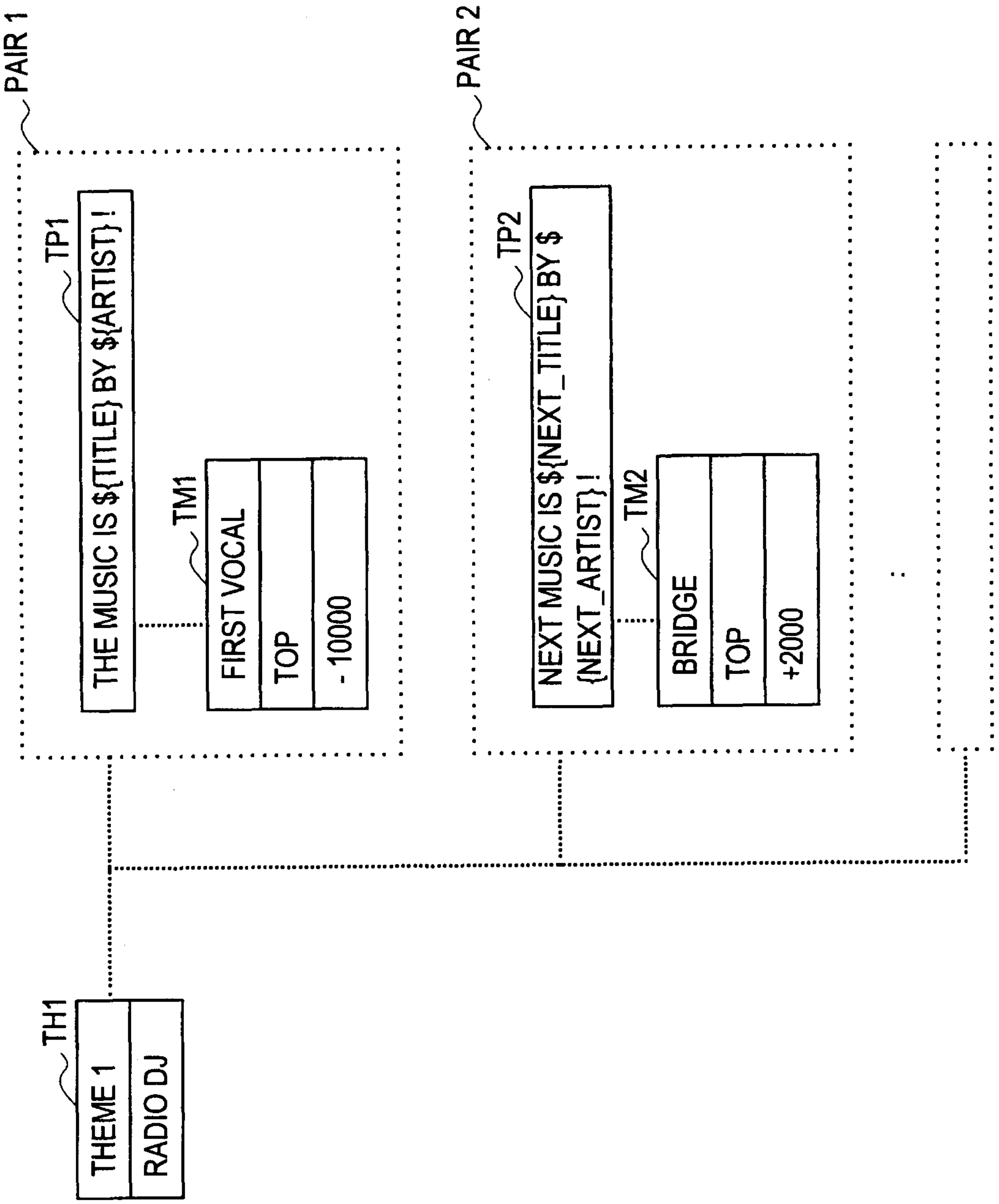
FIG. 6 is an explanatory view which illustrates an example of the theme, the template and the timing data.

FIG. 6 is an explanatory view illustrating an example of a theme, a template and timing data. As illustrated in FIG. 6, a plurality of pairs (pair 1, pair 2, . . . ) of the template and the timing data are associated with the theme data TH1 having data items as the theme ID being "theme 1" and the theme name being "radio DJ".

Pair 1 contains the template TP1 and the timing data TM1. The template TP1 contains text data of "the music is ${TITLE} by ${ARTIST}!". Here, "${ARTIST}" in the text data is a symbol to indicate a position where an artist name among the music attribute values is to be inserted. Further, "${TITLE}" is a symbol to indicate a position where a title among the music attribute values is to be inserted. In the present specification, the position where a music attribute value is to be inserted is denoted by "${ . . . }". However, not limited to this, another symbol may be used. Further, as respective data values of the timing data TM1 corresponding to the template TP1, the type is "first vocal", the alignment is "top", and the offset is "−10000". The above defines that the content of a speech defined by the template TP1 is to be output from the position ten seconds prior to the top of the time period of the first vocal along the music progression.

Meanwhile, pair 2 contains the template TP2 and the timing data TM2. The template TP2 contains text data of "next music is ${NEXT_TITLE} by ${NEXT_ARTIST}!". Here, "${NEXT_ARTIST}" in the text data is a symbol to indicate a position where an artist name of the next music is to be inserted. Further, "${NEXT_TITLE}" is a symbol to indicate a position where a title of the next music is to be inserted. Further, as respective data values of the timing data TM2 corresponding to the template TP2, the type is "bridge", the alignment is "top", and the offset is "+2000". The above defines that the content of a speech defined by the template TP2 is to be output from the position two seconds after the top of the time period of the bridge.

By preparing plural templates and timing data as being classified for each theme, diverse content of speeches can be output at a variety of time points along the music progression in accordance with a theme specified by a user or a system. Some examples of the content of a speech for each theme will be further described later.

2-5. Pronunciation Description Data

The pronunciation description data is the data describing accurate pronunciations of words and phrases (i.e., how to read out to be appropriate) by utilizing standardized symbols. For example, a system for describing pronunciations of words and phrases can adopt international phonetic alphabets (IPA), speech assessment methods phonetic alphabet (SAMPA), extended SAM phonetic alphabet (X-SAMPA) or the like. In the present specification, description is made with an example of adopting X-SAMPA capable of expressing all symbols only by ASCII characters.

Figure 7:
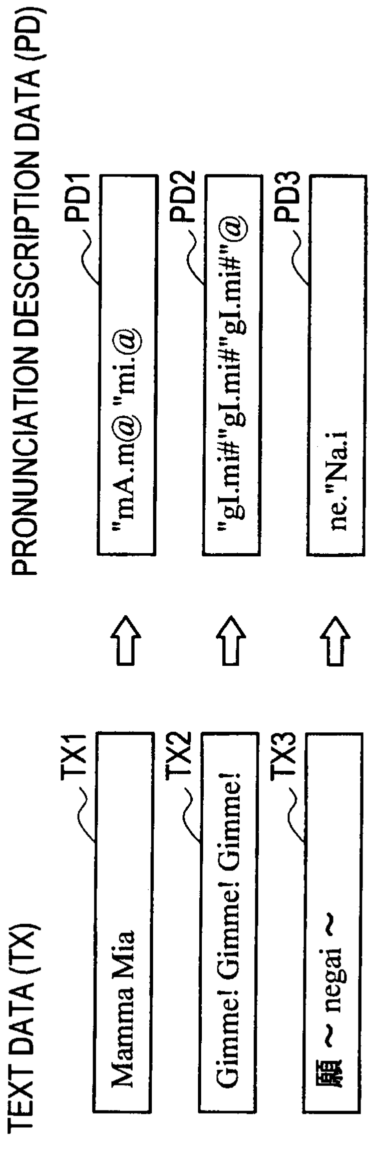
FIG. 7 is an explanatory view which illustrates an example of pronunciation description data.

FIG. 7 is an explanatory view illustrating an example of the pronunciation description data by utilizing X-SAMPA. Three text data TX1 to TX3 and three pronunciation description data PD1 to PD3 corresponding respectively thereto are illustrated in FIG. 7. Here, the text data TX1 indicates a music title of "Mamma Mia". To be precise, the music title is to be pronounced as "mamma miea". However, when the text data is simply input to a text to speech (TTS) engine which reads out a text, there may be a possibility that the music title is wrongly pronounced as "mamma maia". Meanwhile, the pronunciation description data PD1 describes the accurate pronunciation of the text data TX1 as ""mA. m@"mi. @" following to X-SAMPA. When the pronunciation description data PD1 is input to a TTS engine which is capable of supporting X-SAMPA, a speech of accurate pronunciation as "mamma miea" is synthesized.

Similarly, the text data TX2 indicates a music title of "Gimme! Gimme! Gimme!". When the text data TX2 is directly input to a TTS engine, the symbol "!" is construed to indicate an imperative sentence, so that an unnecessary blank time period may be inserted to the title pronunciation. Meanwhile, by synthesizing the speech based on the pronunciation description data PD2 of ""gI. mi#" gI. mi#" gI. mi#"@", the speech of accurate pronunciation is synthesized without an unnecessary blank time period.

The text data TX3 indicates a music title containing a character string of "~negai" in addition to a Chinese character of Japanese language. When the text data TX3 is directly input to the TTS engine, there is a possibility that the symbol of "~" which is unnecessary to be read out is read out as "wave dash". Meanwhile, by synthesizing the speech based on the pronunciation description data PD3 of "ne."Na.i", the speech of accurate pronunciation as "negai" is synthesized.

Such pronunciation description data for a lot of music titles and artist names in the market is provided by the above CDDB (registered trademark) of GraceNote (registered trademark) Inc., for example. Accordingly, the speech processing apparatus 100 can utilize the data.

2-6. Reproduction History Data

Reproduction history data is the data to maintain a history of reproduced music by a user or a device. The reproducing history data may be formed in a format accumulating information of what and when the music was reproduced in time sequence or may be formed after being processed for some summarizing.

FIG. 8 is an explanatory view illustrating an example of the reproduction history data. The reproduction history data HIST1, HIST2 having mutually different forms are illustrated in FIG. 8. The reproduction history data HIST1 is the data accumulating records, in time sequence, containing a music ID to uniquely specify the music and date and time when the music specified by the music ID was reproduced. Meanwhile, the reproduction history data HIST2 is the data obtained by summarizing the reproduction history data HIST1, for example. The reproduction history data HIST2 indicates the number of reproduction within a predetermined time period (for example, one week or one month etc.) for each music ID. In the example of FIG. 8, the number of reproduction of music "M001" is ten times, the number of reproduction of music "M002" is one time, and the number of reproducing music "M123" is five times. Similar to the music attribute values, the values summarized from the reproduction history data such as the number of reproduction for respective music, an ordinal position in a case of being sorted in decreasing order may be inserted to the content of a speech synthesized by the speech processing apparatus 100.

Next, the configuration of the speech processing apparatus 100 to output diverse content of a speech at a variety of time points along the music progression by utilizing the above data will be specifically described.

3. Description of First Embodiment

3-1. Configuration Example of Speech Processing Apparatus

Figure 9:
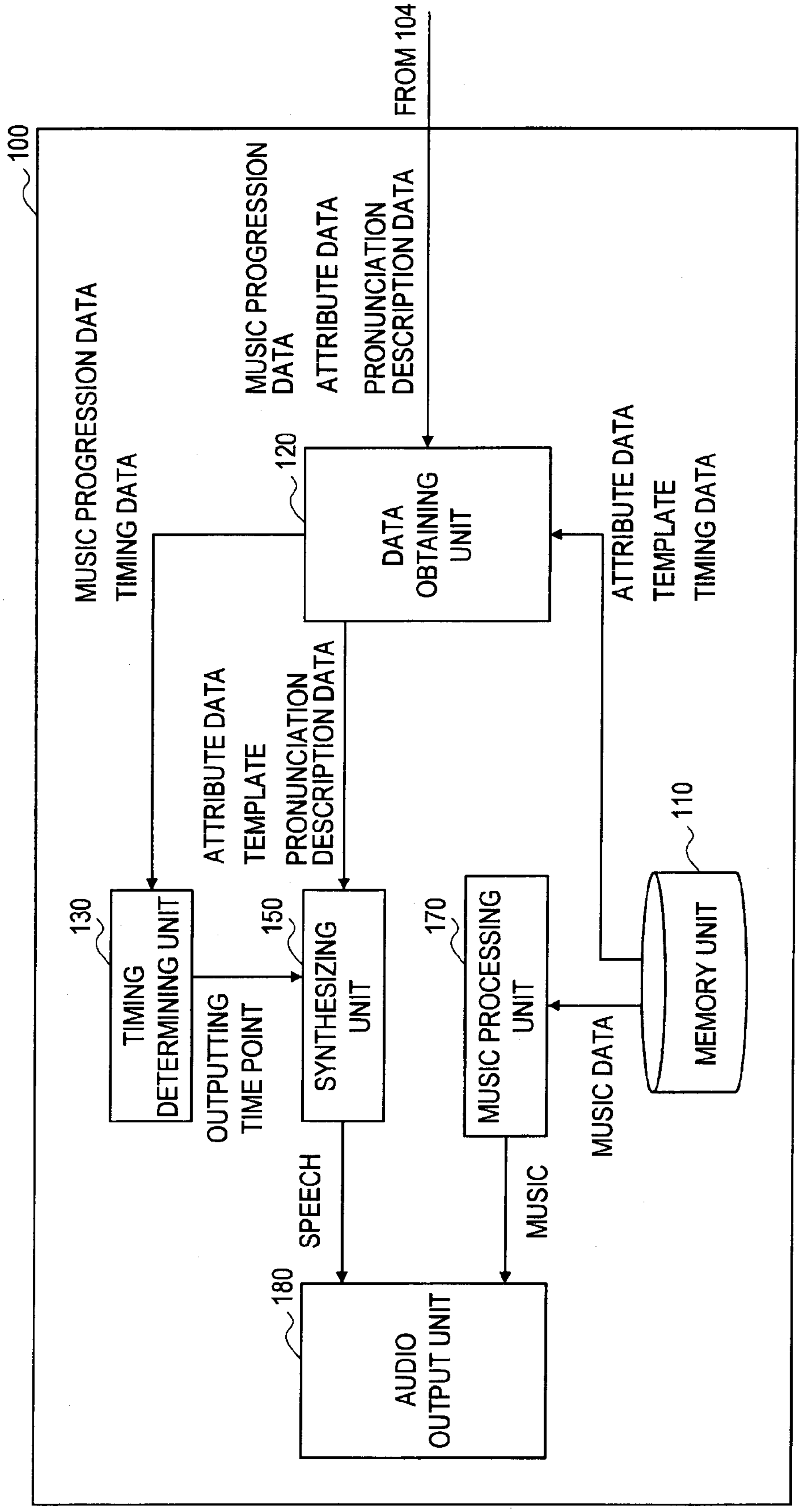
FIG. 9 is a block diagram which illustrates an example of the configuration of a speech processing apparatus according to a first embodiment.

FIG. 9 is a block diagram illustrating an example of the configuration of the speech processing apparatus 100 according to the first embodiment of the present invention. As illustrated in FIG. 9, the speech processing apparatus 100 includes a memory unit 110, a data obtaining unit 120, a timing determining unit 130, a synthesizing unit 150, a music processing unit 170 and an audio output unit 180.

The memory unit 110 stores data used for processes of the speech processing apparatus 100 by utilizing a storage medium such as a hard disk and a semiconductor memory, for example. The data to be stored by the memory unit 110 contains the music data, the attribute data being associated with the music data and the template and timing data which are classified for each theme. Here, the music data among these data is output to the music processing unit 170 during music reproducing. The attribute data, the template and the timing data are obtained by the data obtaining unit 120 and output respectively to the timing determining unit 130 and the synthesizing unit 150.

The data obtaining unit 120 obtains the data to be used by the timing determining unit 130 and the synthesizing unit 150 from the memory unit 110 or the external database 104. More specifically, the data obtaining unit 120 obtains a part of the attribute data of the music to be reproduced and the template and timing data corresponding to the theme from the memory unit 110, for example, and outputs the timing data to the timing determining unit 130 and outputs the attribute data and the template to the synthesizing unit 150. In addition, for example, the data obtaining unit 120 obtains a part of the attribute data of the music to be reproduced, the music progression data and the pronunciation description data from the external database 104, for example, and outputs the music progression data to the timing determining unit 130 and outputs the attribute data and the pronunciation description data to the synthesizing unit 150.

The timing determining unit 130 determines output time point when a speech is to be output along the music progression by utilizing the music progression data and the timing data obtained by the data obtaining unit 120. For example, it is assumed that the music progression data exemplified in FIG. 4 and the timing data TM1 exemplified in FIG. 6 are input to the timing determining unit 130. In this case, first, the timing determining unit 130 searches timeline data specified by the type "the first vocal" of the timing data TM1 from the music progression data. Then, the timeline data TL2 exemplified in FIG. 4 is specified to be the data indicating the top time point of the first vocal time period of the music. Accordingly, the timing determining unit 130 determines that the output time point of the speech synthesized from the template TP1 is position "11000" by adding the offset value "−10000" of the timing data TM1 to position "21000" of the timeline data TL2.

In this manner, the timing determining unit 130 determines the output time point of a speech synthesized from a template corresponding to each timing data respectively for the plural timing data being possible to be input from the data obtaining unit 120. Then, the timing determining unit 130 outputs the output time point determined for each template to the synthesizing unit 150.

Here, a speech output time point may be determined not to exist (i.e., a speech is not output) for some templates depending on content of the music progression data. It may be also considered that plural candidates for the output time point exist for a single timing data. For example, the output time point is specified to be two seconds after the top of the bridge for the timing data TM2 exemplified in FIG. 6. Here, when the bridge is played in plural times in single music, the output time point is specified also in plural from the timing data TM2. In this case, the timing determining unit 130 may determine that the first output time point is to be the output time point of a speech synthesized from the template TP2 corresponding to the timing data TM2 among the plural output time points. Instead, the timing determining unit 130 may determine that the speech is to be repeatedly output at the plural output time points.

The synthesizing unit 150 synthesizes the speech to be output during music reproducing by utilizing the attribute data, the template and the pronunciation description data which are obtained by the data obtaining unit 120. In the case that the text data of the template has a symbol indicating a position where a music attribute value is to be inserted, the synthesizing unit 150 inserts the music attribute value expressed by the attribute data to the position.

Figure 10:
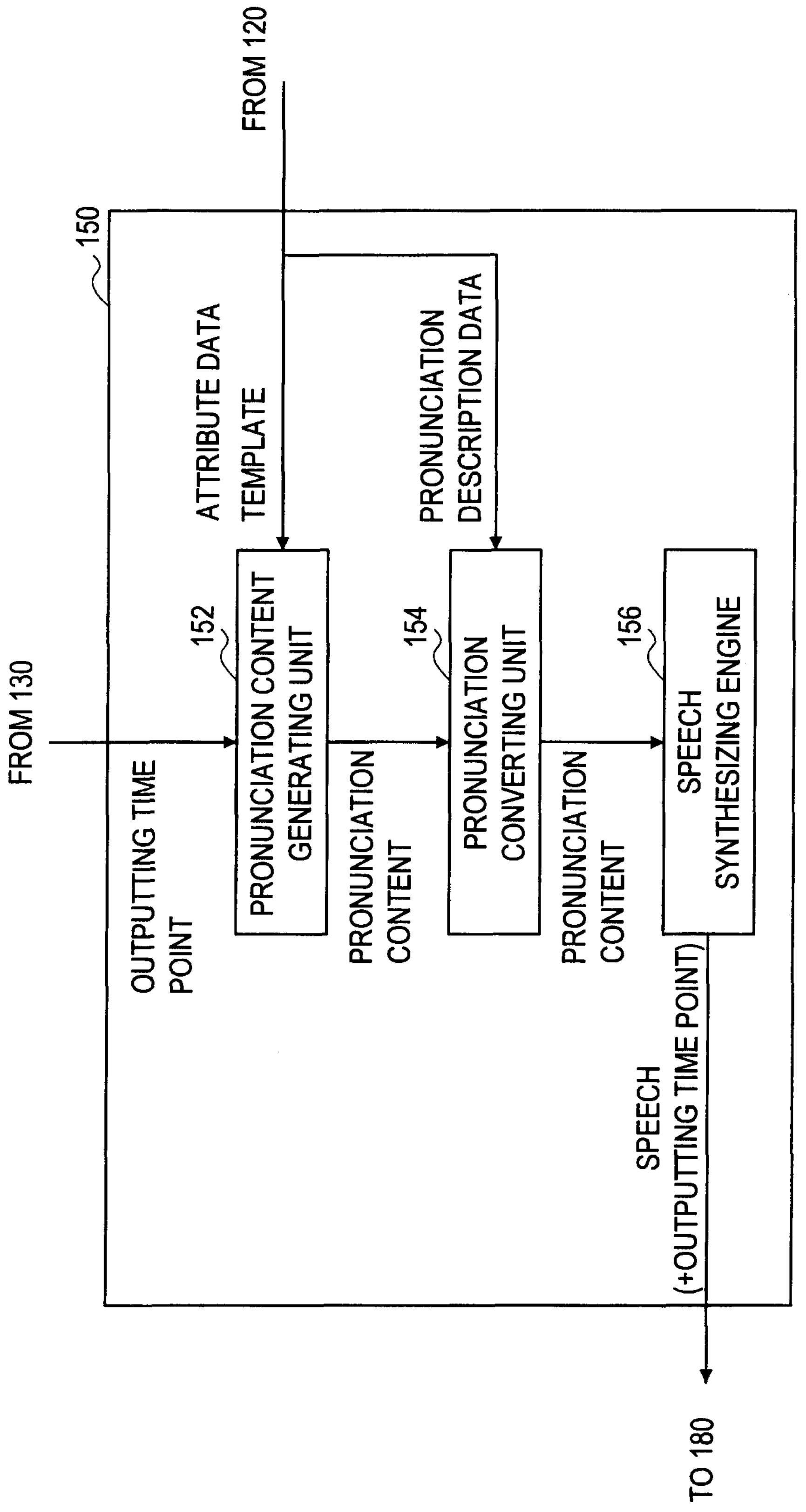
FIG. 10 is a block diagram which illustrates an example of a detailed configuration of a synthesizing unit according to the first embodiment.

FIG. 10 is a block diagram illustrating an example of the detailed configuration of the synthesizing unit 150. With reference to FIG. 10, the synthesizing unit 150 includes a pronunciation content generating unit 152, a pronunciation converting unit 154 and a speech synthesizing engine 156.

The pronunciation content generating unit 152 inserts a music attribute value to the text data of the template input from the data obtaining unit 120 and generates pronunciation content of the speech to be output during music reproducing. For example, it is assumed that the template TP1 exemplified in FIG. 6 is input to the pronunciation content generating unit 152. In this case, the pronunciation content generating unit 152 recognizes a symbol ${ARTIST} in the text data of the template TP1. Then, the pronunciation content generating unit 152 extracts an artist name of the music to be reproduced from the attribute data and inserts to the position of the symbol ${ARTIST}. Similarly, the pronunciation content generating unit 152 recognizes a symbol ${TITLE} in the text data of the template TP1. Then, the pronunciation content generating unit 152 extracts a title of the music to be reproduced from the attribute data and inserts to the position of the symbol ${TITLE}. Consequently, when the title of the music to be reproduced is "T1" and the artist name is "A1", the pronunciation content of "the music is T1 by A1!" is generated based on the template TP1.

The pronunciation converting unit 154 converts, by utilizing the pronunciation description data, a pronunciation content for a part having a possibility to cause wrong pronunciation when simply reading out the text data such as a music title and an artist name among the pronunciation content generated by the pronunciation content generating unit 152. For example, in the case that a music title "Mamma Mia" is contained in the pronunciation content generated by the pronunciation content generating unit 152, the pronunciation converting unit 154 extracts, for example, the pronunciation description data PD1 exemplified in FIG. 7 from the pronunciation description data input from the data obtaining unit 120 and converts "Mamma Mia" into ""mA. m@ "mi. @". As a result, the pronunciation content from which a possibility of wrong pronunciation is eliminated is generated.

Exemplarily, the speech synthesizing engine 156 is a TTS engine capable of reading out symbols described in the X-SAMPA format in addition to normal texts. The speech synthesizing engine 156 synthesizes a speech to read out the pronunciation content from the pronunciation content input from the pronunciation converting unit 154. The signal of the speech synthesized by the speech synthesizing unit 154 may be formed in an arbitrary format such as pulse code modulation (PCM) and adaptive differential pulse code modulation (ADPCM). The speech synthesized by the speech synthesizing engine 156 is output to the audio output unit 180 in association with the output time point determined by the timing determining unit 130.

Here, there is a possibility that plural templates are input to the synthesizing unit 150 for single music. When the music reproducing and the speech synthesizing are concurrently performed in this case, it is preferable that the synthesizing unit 150 performs processing on the templates in time sequence of the output time points from the earlier. Accordingly, it enables to reduce the possibility that an output time point is passed prior to the time point of completing the speech synthesizing.

In the following, description of the configuration of the speech processing apparatus 100 is continued with reference to FIG. 9.

In order to reproduce music, the music processing unit 170 obtains music data from the memory unit 110 and generates an audio signal in the PCM format or the ADPCM format, for example, after performing processes such as stream unbundling and decoding. Further, the music processing unit 170 may perform processing only on a part extracted from the music data in accordance with a theme specified by a user or a system, for example. The audio signal generated by the music processing unit 170 is output to the audio output unit 180.

The speech synthesized by the synthesizing unit 150 and the music (i.e., the audio signal thereof) generated by the music processing unit 170 are input to the audio output unit 180. Exemplarily, the speech and music are maintained by utilizing two or more tracks (or buffers) capable of being processed in parallel. The audio output unit 180 outputs the speech synthesized by the synthesizing unit 150 at the output time point determined by the timing determining unit 130 while sequentially outputting the music audio signals. Here, in the case that the speech processing apparatus 100 is provided with a speaker, the audio output unit 180 may output the music and speech to the speaker or may output the music and speech (i.e., the audio signals thereof) to an external device.

Up to this point, an example of the configuration of the speech processing apparatus 100 has been described with reference to FIGS. 9 and 10. Exemplarily, among the respective units of the above speech processing apparatus 100, processes of the data obtaining unit 120, the timing determining unit 130, the synthesizing unit 150 and the music processing unit 170 are actualized by utilizing software and performed by an arithmetic device such as a central processing unit (CPU) and a digital signal processor (DSP). The audio output unit 180 may be provided with a DA conversion circuit and an analog circuit to perform processing on the music and speech to be input in addition to the arithmetic device. Further, as described above, the memory unit 110 may be configured to utilize a storage medium such as a hard disk and a semiconductor memory.

3-2. Example of Processing Flow

Figure 11:
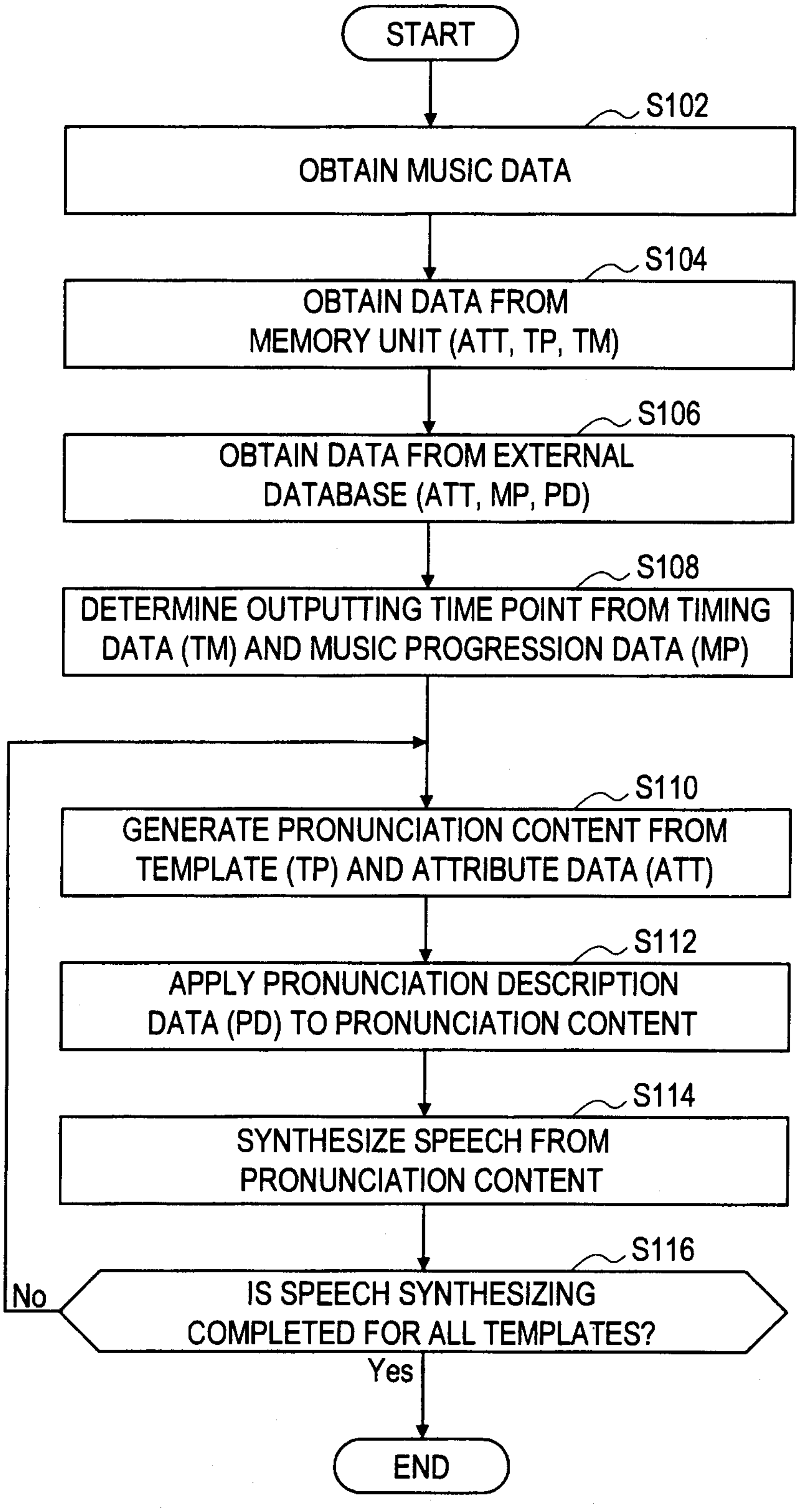
FIG. 11 is a flowchart which describes an example of the flow of the speech processing according to the first embodiment.

Next, an example of the flow of speech processing by the speech processing apparatus 100 will be described with reference to FIG. 11. FIG. 11 is a flowchart illustrating the example of the speech processing flow by the speech processing apparatus 100.

With reference to FIG. 11, first, the music processing unit 170 obtains music data of the music to be reproduced from the memory unit 110 (step S102). Then, the music processing unit 170 notifies the music ID to specify the music to be reproduced and the like to the data obtaining unit 120, for example.

Next, the data obtaining unit 120 obtains a part (for example, TOC data) of attribute data of the music to be reproduced and a template and timing data corresponding to a theme from the memory unit 110 (step S104). Then, the data obtaining unit 120 outputs the timing data to the timing determining unit 130 and outputs the attribute data and the template to the synthesizing unit 150.

Next, the data obtaining unit 120 obtains a part (for example, external data) of the attribute data of the music to be reproduced, music progression data and pronunciation description data from the external database 104 (step S106). Then, the data obtaining unit 120 outputs the music progression data to the timing determining unit 130 and outputs the attribute data and the pronunciation description data to the synthesizing unit 150.

Next, the timing determining unit 130 determines the output time point when the speech synthesized from the template is to be output by utilizing the music progression data and the timing data (step S108). Then, the timing determining unit 130 outputs the determined output timepoint to the synthesizing unit 150.

Next, the pronunciation content generating unit 152 of the synthesizing unit 150 generates pronunciation content in the text format from the template and the attribute data (step S110). Further, the pronunciation converting unit 154 replaces a music title and an artist name contained in the pronunciation content with symbols according to the X-SAMPA format by utilizing the pronunciation description data (step S112). Then, the speech synthesizing engine 156 synthesizes the speech to be output from the pronunciation content (step S114). The processes from step S110 to step S114 are repeated until speech synthesizing is completed for all templates of which output time point is determined by the timing determining unit 130 (step S116).

When the speech synthesizing is completed for all templates having the output time point determined, the flowchart of FIG. 11 is completed.

Here, the speech processing apparatus 100 may perform the speech processing of FIG. 11 in parallel to the process such as decoding of the music data by the music processing unit 170. In this case, it is preferable that the speech processing apparatus 100 starts the speech processing of FIG. 11 in first and starts the decoding and the like of the music data after the speech synthesizing relating to the first music in a playlist (or the speech synthesizing corresponding to the earliest output time point among speeches relating to the music) is completed, for example.

3-3. Example of Theme

Next, examples of diverse speeches provided by the speech processing apparatus 100 according to the present embodiment will be described for three types of themes with reference to FIGS. 12 to 16.

(First Theme: Radio DJ)

Figure 12:
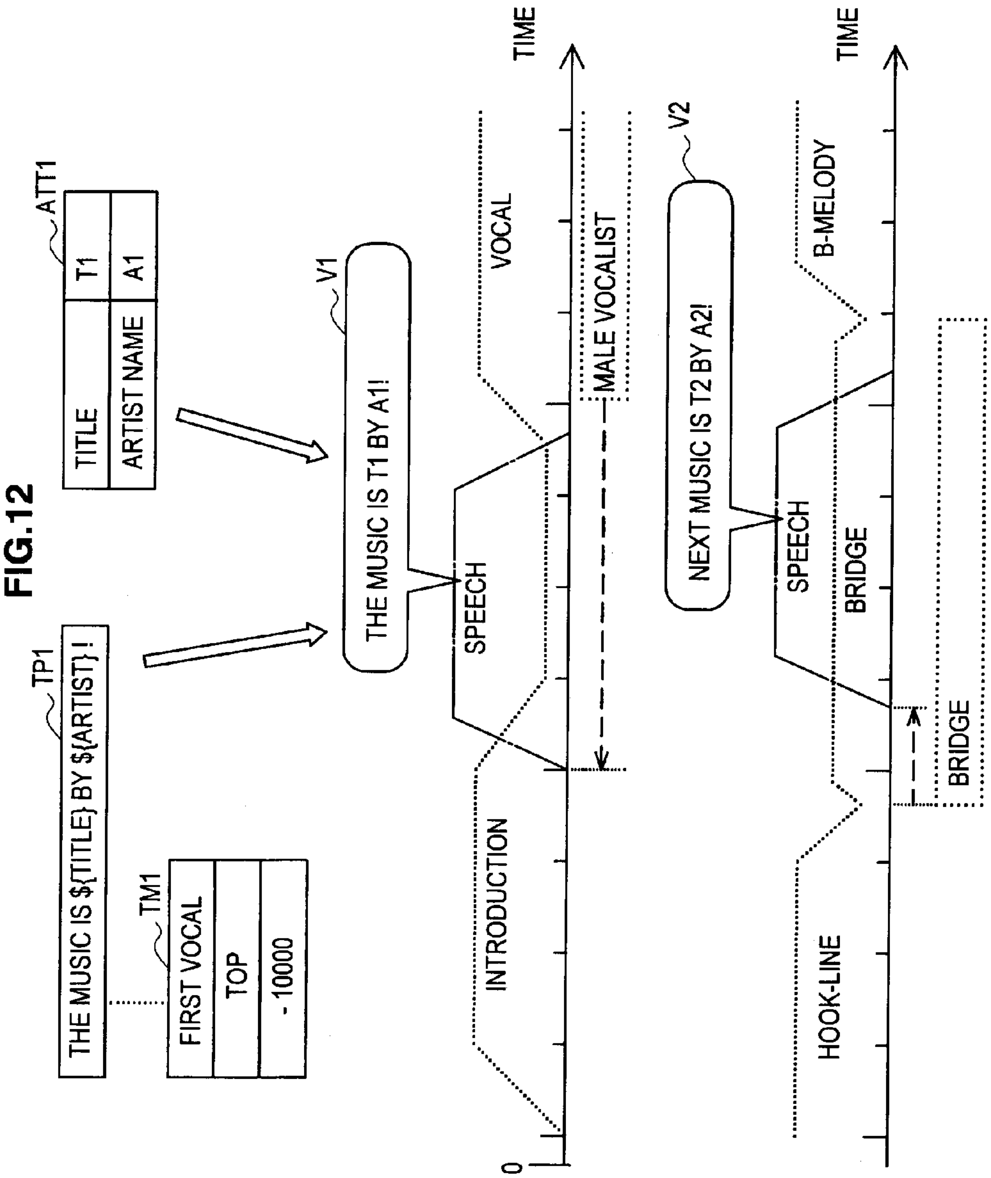
FIG. 12 is an explanatory view which illustrates an example of a speech corresponding to a first theme.

FIG. 12 is an explanatory view illustrating an example of a speech corresponding to the first theme. The first theme has a theme name of "Radio DJ". An example of a template and timing data belonging to the first theme is illustrated in FIG. 6.

As illustrated in FIG. 12, a speech V1 of "the music is T1 by A1!" is synthesized based on the template TP1 containing the text data of "the music is ${TITLE} by ${ARTIST}!" and the attribute data ATT1. Further, the output time point of the speech V1 is determined at ten seconds before the top of the time period of the first vocal indicated by the music progression data based on the timing data TM1. Accordingly, the radio-DJ-like speech having realistic sensation is output as "the music is T1 by A1!" immediately before the first vocal starts without overlapping to the vocal.

Similarly, a speech V2 of "next music is T2 by A2!" is synthesized based on the template TP2 of FIG. 6. Further, the output time point of the speech V2 is determined at two seconds after the top of the time period of the bridge indicated by the music progression data based on the timing data TM2. Accordingly, the radio-DJ-like speech having realistic sensation is output as "next music is T2 by A2!" immediately after a hook-line ends and the bridge starts without overlapping to the vocal.

(Second Theme: Official Countdown)

Figure 13:
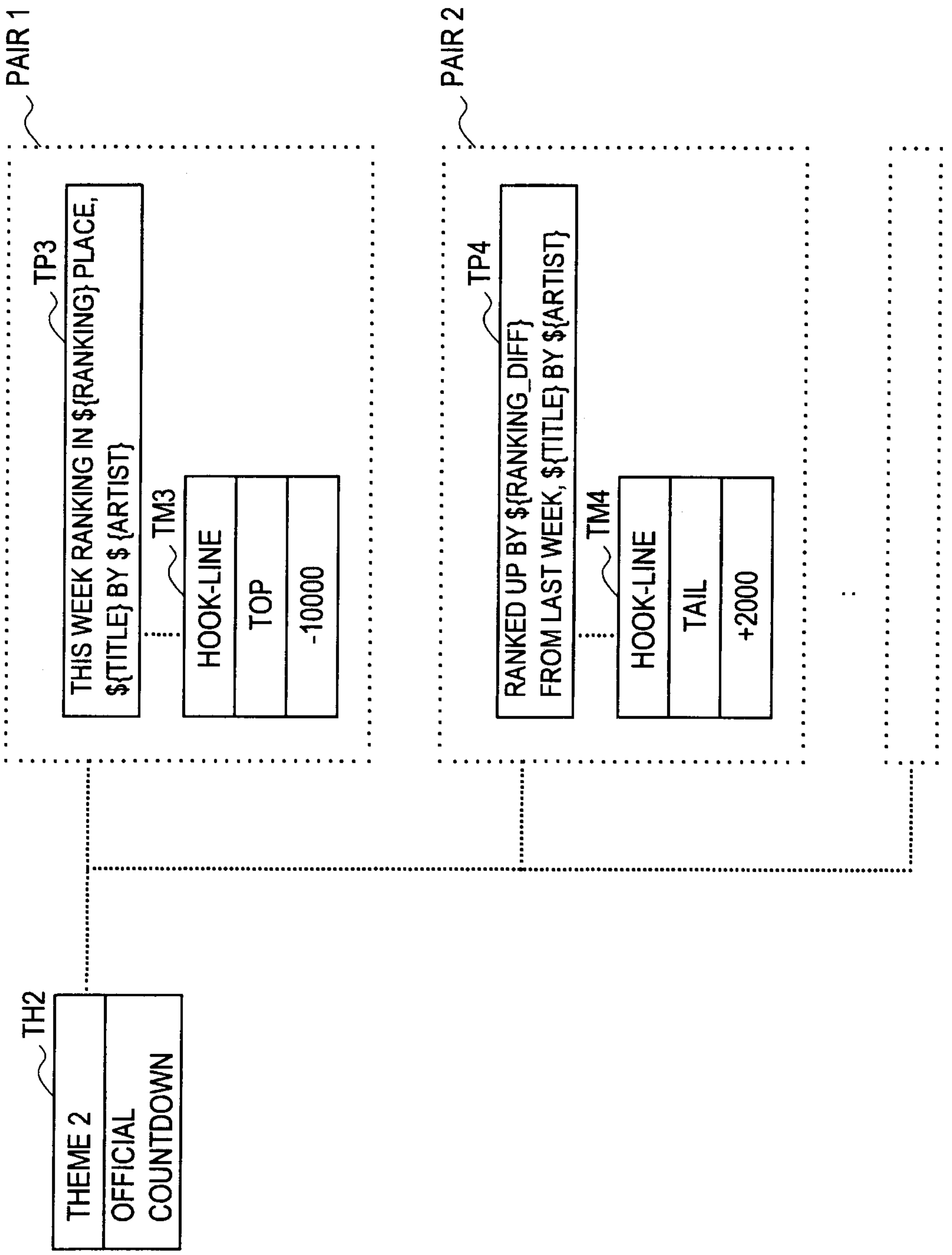
FIG. 13 is an explanatory view which illustrates an example of a template and timing data belonging to a second theme.

FIG. 13 is an explanatory view illustrating an example of a template and timing data belonging to the second theme. As illustrated in FIG. 13, plural pairs of a template and timing data (i.e., pair 1, pair 2, . . . ) are associated with the theme data TH2 having data items as the theme ID is "theme 2" and the theme name is "official countdown".

Pair 1 contains a template TP3 and timing data TM3. The template TP3 contains text data of "this week ranking in ${RANKING} place, ${TITLE} by ${ARTIST}". Here, "${RANKING}" in the text data is a symbol indicating a position where an ordinal position of weekly sales ranking of the music is to be inserted among the music attribute values, for example. Further, as respective data values of the timing data TM3 corresponding to the template TP3, the type is "hook-line", the alignment is "top", and the offset is "−10000".

Meanwhile, pair 2 contains a template TP4 and timing data TM4. The template TP4 contains text data of "ranked up by ${RANKING_DIFF} from last week, ${TITLE} by ${ARTIST}". Here, "${RANKING_DIFF}" in the text data is a symbol indicating a position where variation of the weekly sales ranking of the music from last week is to be inserted among the music attribute values, for example. Further, as respective data values of the timing data TM4 corresponding to the template TP4, the type is "hook-line", the alignment is "tail", and the offset is "+2000".

Figure 14:
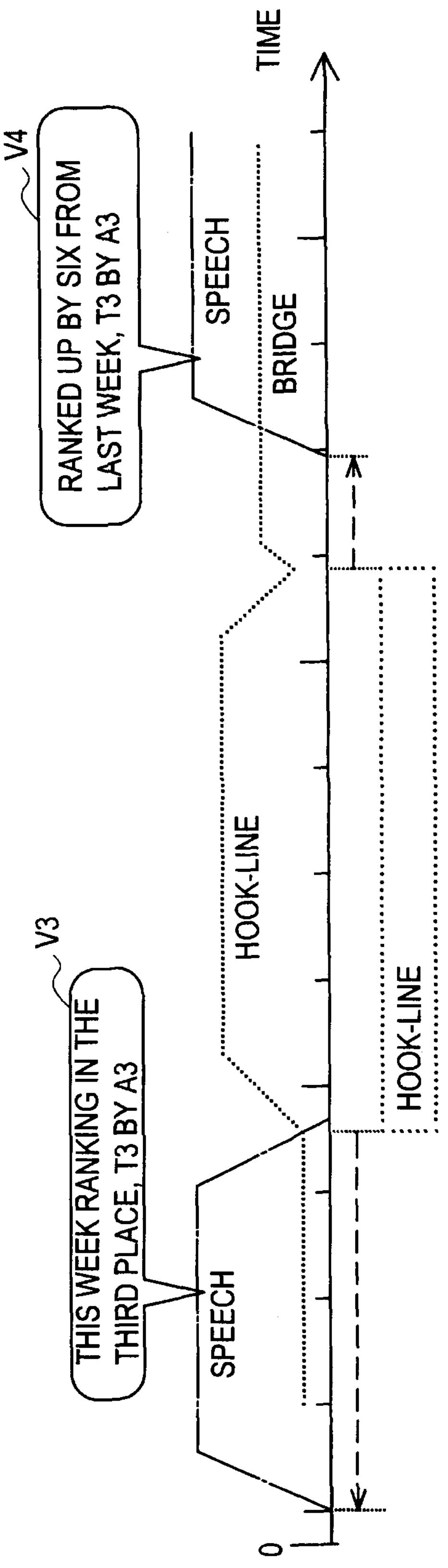
FIG. 14 is an explanatory view which illustrates an example of a speech corresponding to a second theme.

FIG. 14 is an explanatory view illustrating an example of the speech corresponding to the second theme.

As illustrated in FIG. 14, the speech V3 of "this week ranking in the third place, T3 by A3" is synthesized based on the template TP3 of FIG. 13. Further, the output time point of the speech V1 is determined at ten seconds before the top of the time period of the hook-line indicated by the music progression data based on the timing data TM3. Accordingly, the sales ranking countdown-like speech is output as "this week ranking in third place, T3 by A3" immediately before the hook-line is performed.

Similarly, a speech V4 of "ranked up by six from last week, T3 by A3" is synthesized based on the template TP4 of FIG. 13. Further, the output time point of the speech V4 is determined at two seconds after the tail of the time period of the hook-line indicated by the music progression data based on the timing data TM4. Accordingly, the sales ranking countdown-like speech is output as "ranked up by six from last week, T3 by A3" immediately after the hook-line ends.

When the theme is such official countdown, the music processing unit 170 may extract and output a part of the music containing the hook-line to the audio output unit 180 instead of outputting the entire music to the audio output unit 180. In this case, the speech output time point determined by the timing determining unit 130 is possibly moved in accordance with the part extracted by the music processing unit 170. With this theme, new entertainment property can be provided to a user by reproducing music of only hook-line parts one after another in a countdown style in accordance with ranking data obtained as external data, for example.

(Third Theme: Information Provision)

Figure 15:
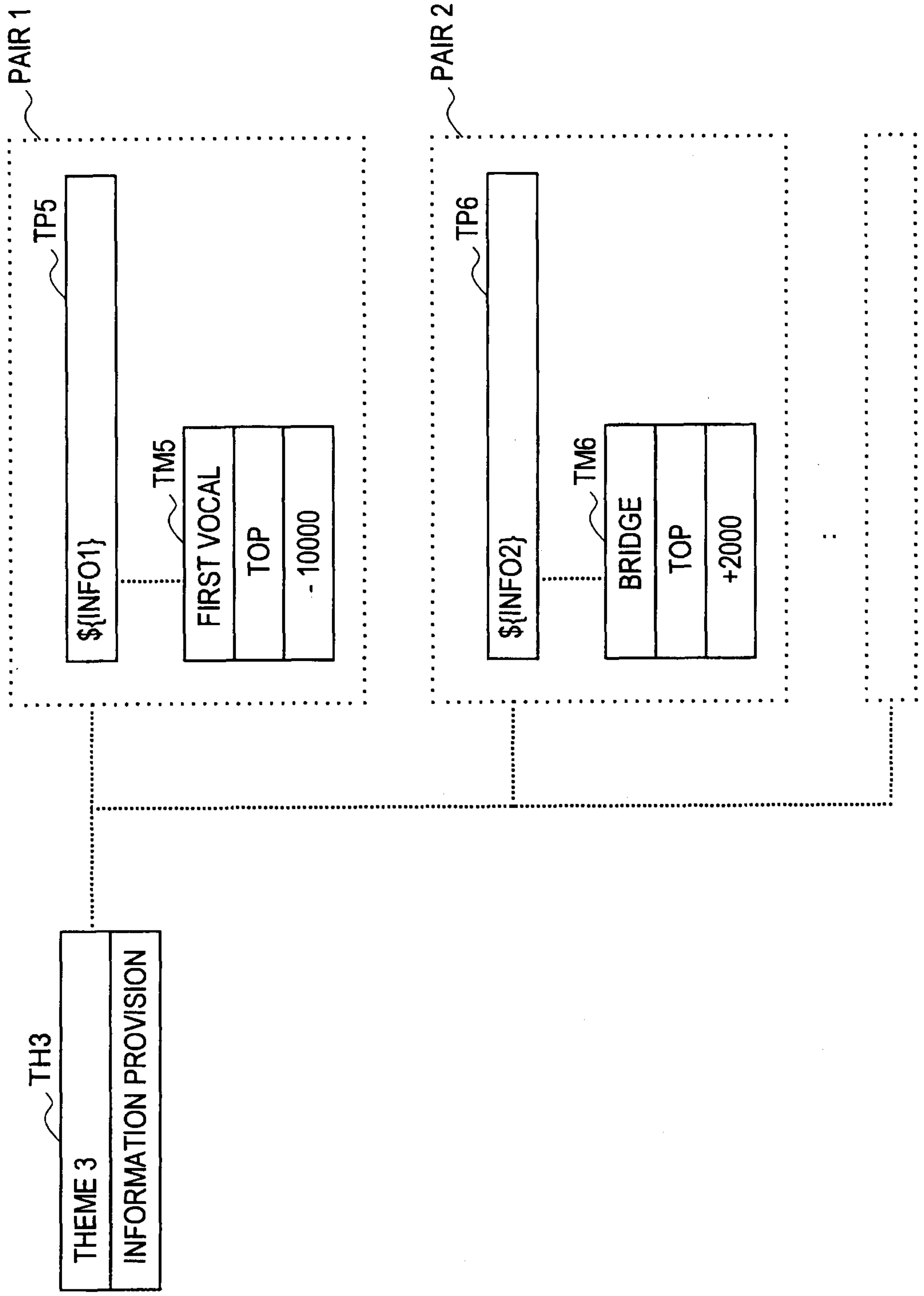
FIG. 15 is an explanatory view which illustrates an example of a template and timing data belonging to a third theme.

FIG. 15 is an explanatory view illustrating an example of a template and timing data belonging to the third theme. As illustrated in FIG. 15, plural pairs of a template and timing data (i.e., pair 1, pair 2, . . . ) are associated with the theme data TH3 having data items as the theme ID is "theme 3" and the theme name is "information provision".

Pair 1 contains a template TP5 and timing data TM5. The template TP5 contains text data of "$ {INFO1}". As respective data values of the timing data TM5 corresponding to the template TP5, the type is "first vocal", the alignment is "top", and the offset is "−10000".

Pair 2 contains a template TP6 and timing data TM6. The template TP6 contains text data of "${INFO2}". As respective data values of the timing data TM6 corresponding to the template TP6, the type is "bridge", the alignment is "top", and the offset is "+2000".

Here, "${INFO1}" and "${INFO2}" in the text data are symbols indicating positions where first and second information obtained by the data obtaining unit 120 corresponding to some conditions are respectively inserted. The first and second information may be news, weather forecast or advertisement. Further, the news and advertisement may be related to the music or artist or may not be related thereto. For example, the information can be obtained from the external database 104 by the data obtaining unit 120.

Figure 16:
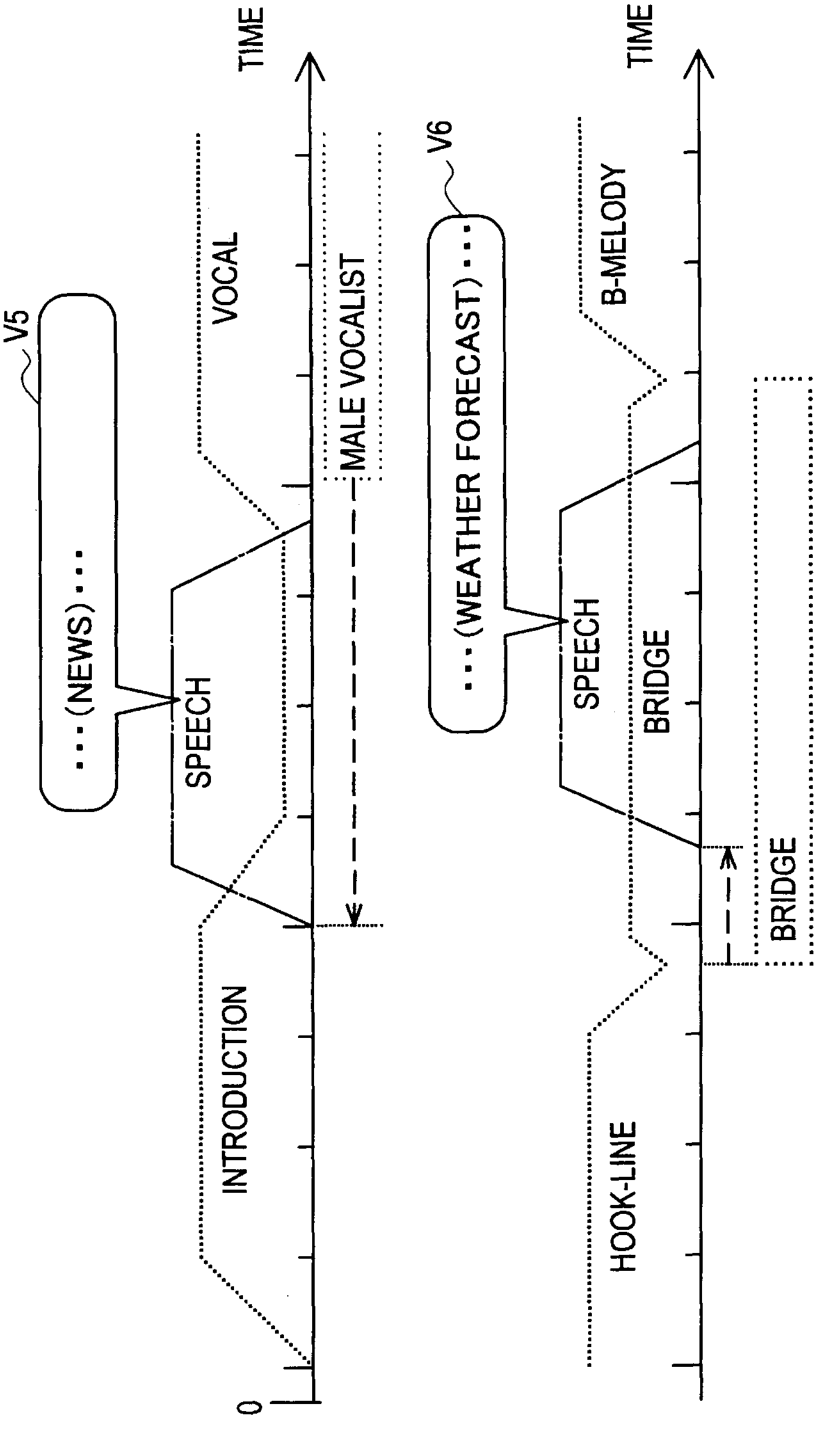
FIG. 16 is an explanatory view which illustrates an example of a speech corresponding to a third theme.

FIG. 16 is an explanatory view illustrating an example of the speech corresponding to the third theme.

With reference to FIG. 16, a speech V5 of reading out news is synthesized based on the template TP5. Further, the output time point of the speech V5 is determined at ten seconds before the top of the time period of the first vocal indicated by the music progression data based on the timing data TM5. Accordingly, the speech of reading out news is output immediately before the first vocal starts.

Similarly, a speech V6 of reading out weather forecast is synthesized based on the template TP6. Further, the output time point of the speech V6 is determined at two seconds after the top of the bridge indicated by the music progression data based on the timing data TM6. Accordingly, the speech of reading out weather forecast is output immediately after a hook-line ends and the bridge starts.

With this theme, since information such as news and weather forecast is provided to a user in a time period of an introduction or a bridge without presence of vocal, for example, the user can use time effectively while enjoying music.

3-4. Conclusion of First Embodiment

Up to this point, the speech processing apparatus 100 according to the first embodiment of the present invention has been described with reference to FIGS. 9 to 16. According to the present embodiment, an output time point of a speech to be output during music reproducing is dynamically determined by utilizing music progression data defining properties of one or more time points or one or more time periods along music progression. Then, the speech is output at the determined output time point during music reproducing. Accordingly, the speech processing apparatus 100 is capable of outputting a speech at a variety of time points along the music progression. At that time, timing data to define the speech outputting timing in association with either the one or more time points or the one or more time periods is utilized. Accordingly, the speech output time point can be flexibly set or changed in accordance with definition of the timing data.

Further, according to the present embodiment, speech content to be output is described in a text format using a template. The text data has a specific symbol indicating a position where a music attribute value is to be inserted. Then, the music attribute value can be dynamically inserted to the position of the specific symbol. Accordingly, various types of speech content can be easily provided and the speech processing apparatus 100 can output diverse speeches along the music progression. Further, according to the present embodiment, it is also easy to subsequently add speech content to be output by newly defining a template.

Furthermore, according to the present embodiment, plural themes relating to music reproduction are prepared and the above templates are defined in association respectively with any one of the plural themes. Accordingly, since different speech content is output in accordance with theme selection, the speech processing apparatus 100 is capable of amusing a user for a long term.

Here, in the description of the present embodiment, a speech is output along music progression. In addition, the speech processing apparatus 100 may output short music such as a jingle and effective sound along therewith, for example.

4. Description of Second Embodiment>

4-1. Configuration Example of Speech Processing Apparatus

Figure 17:
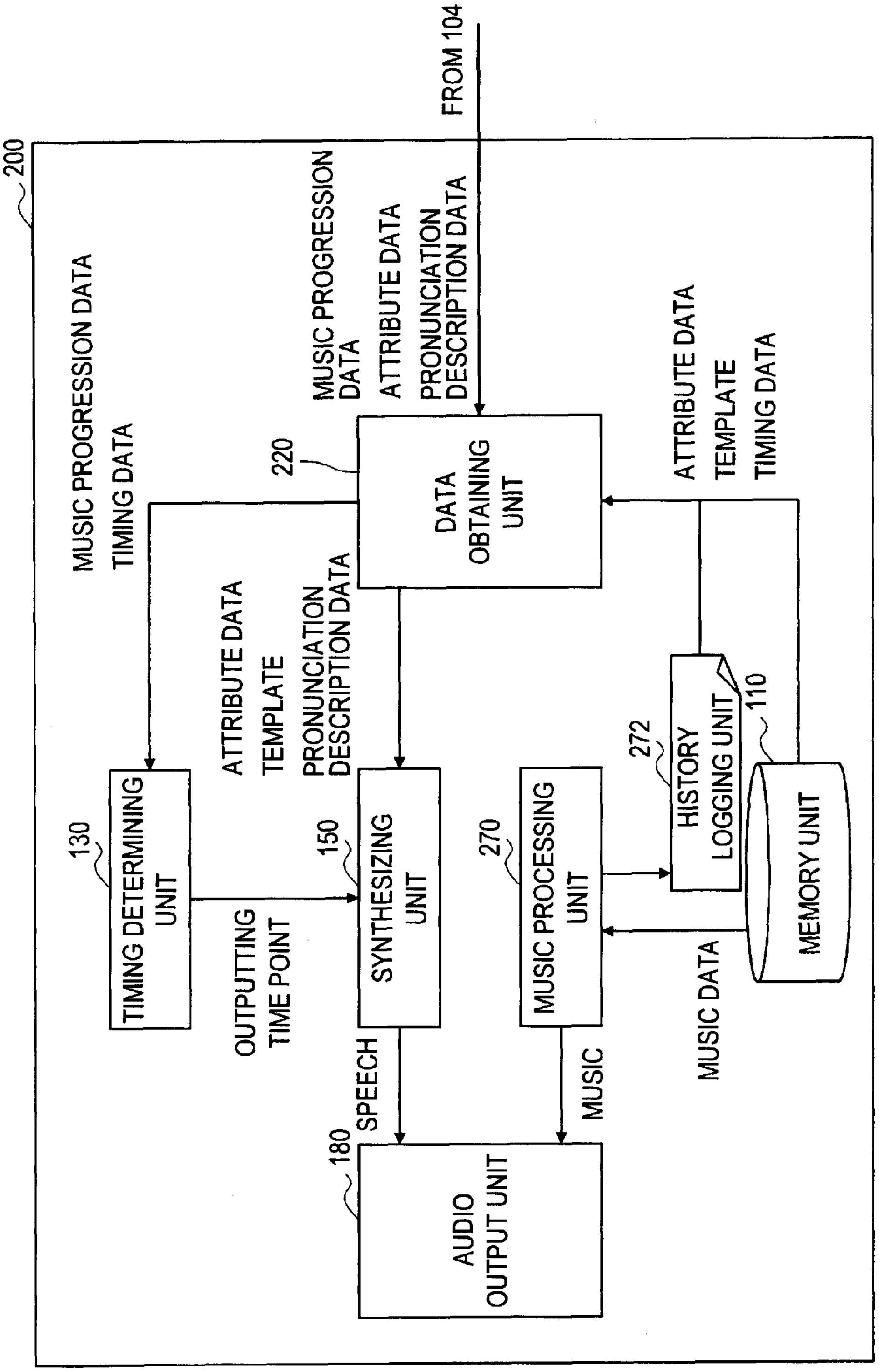
FIG. 17 is a block diagram which illustrates an example of the configuration of a speech processing apparatus according to a second embodiment.

FIG. 17 is a block diagram illustrating an example of the configuration of a speech processing apparatus 200 according to the second embodiment of the present invention. With reference to FIG. 17, the speech processing apparatus 200 includes the memory unit 110, a data obtaining unit 220, the timing determining unit 130, the synthesizing unit 150, a music processing unit 270, a history logging unit 272 and the audio output unit 180.

Similar to the data obtaining unit 120 according to the first embodiment, the data obtaining unit 220 obtains data used by the timing determining unit 130 or the synthesizing unit 150 from the memory unit 110 or the external database 104. In addition, in the present embodiment, the data obtaining unit 220 obtains reproduction history data logged by the later-mentioned history logging unit 272 as a part of music attribute data and outputs to the synthesizing unit 150. Accordingly, the synthesizing unit 150 becomes capable of inserting an attribute value set based on music reproduction history to a predetermined position of text data contained in a template.

Similar to the music processing unit 170 according to the first embodiment, the music processing unit 270 obtains music data from the memory unit 110 to reproduce the music and generates an audio signal by performing processes such as stream unbundling and decoding. The music processing unit 270 may perform processing only on a part extracted from the music data in accordance with a theme specified by a user or a system, for example. The audio signal generated by the music processing unit 270 is output to the audio output unit 180. In addition, in the present embodiment, the music processing unit 270 outputs a history of music reproduction to the history logging unit 272.

The history logging unit 272 logs music reproduction history input from the music processing unit 270 in a form of the reproduction history data HIST1 and/or HIST2 described with reference to FIG. 8 by utilizing a storage medium such as a hard disk and a semiconductor memory, for example. Then, the history logging unit 272 outputs the music reproduction history logged thereby to the data obtaining unit 220 as required.

The configuration of the speech processing apparatus 200 enables to output a speech based on the fourth theme as described in the following.

4-2. Example of Theme (Fourth Theme: Personal Countdown)

Figure 18:
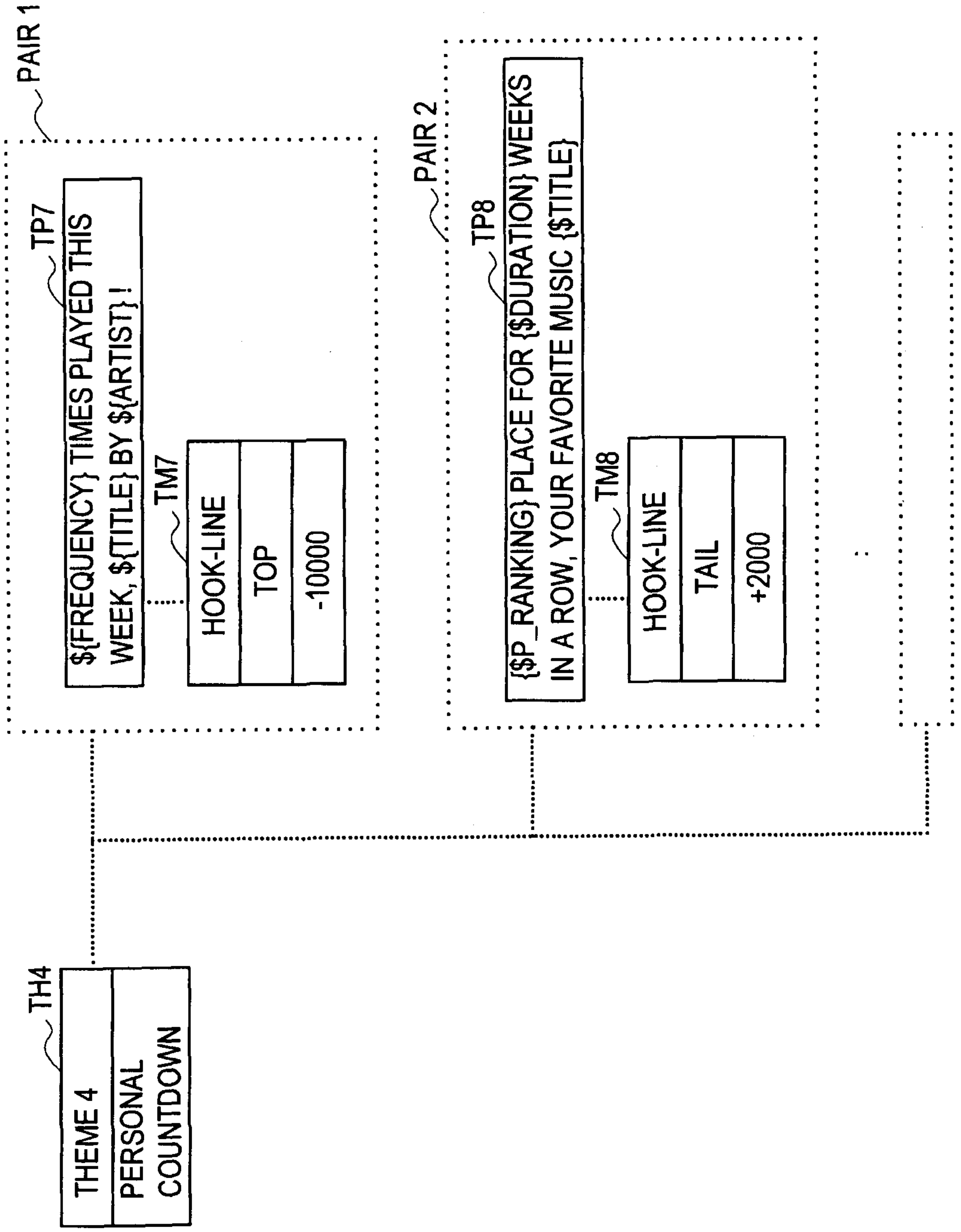
FIG. 18 is an explanatory view which illustrates an example of a template and timing data belonging to a fourth theme.

FIG. 18 is an explanatory view illustrating an example of a template and timing data belonging to the fourth theme. With reference to FIG. 18, plural pairs of a template and timing data (i.e., pair 1, pair 2, . . . ) are associated with the theme data TH4 having data items as the theme ID is "theme 4" and the theme name is "personal countdown".

Pair 1 contains a template TP7 and timing data TM7. The template TP7 contains text data of "${FREQUENCY} times played this week, ${TITLE} by ${ARTIST}!". Here, the "${FREQUENCY}" in the text data is a symbol indicating a position where number of times of reproduction of the music in last week is to be inserted among the music attribute values set based on the music reproduction history, for example. Such number of times of reproduction is contained in the reproduction history data HIST2 of FIG. 8, for example. Further, as respective data values of the timing data TM7 corresponding to the template TP7, the type is "hook-line", the alignment is "top", and the offset is "−10000".

Meanwhile, pair 2 contains a template TP8 and timing data TM8. The template TP8 contains text data of "${P_RANKING} place for ${DURATION} weeks in a row, your favorite music ${TITLE}". Here, "${DURATION}" in the text data is a symbol indicating a position where a numeric value denoting how many weeks the music has been staying in the same ordinal position of the ranking is to be inserted among the music attribute values set based on the music reproduction history, for example. "${P_RANKING}" in the text data is a symbol indicating a position where an ordinal position of the music on reproduction number ranking is to be inserted among the music attribute values set based on the music reproduction history, for example. Further, as respective data values of the timing data TM8 corresponding to the template TP8, the type is "hook-line", the alignment is "tail", and the offset is "+2000".

Figure 19:
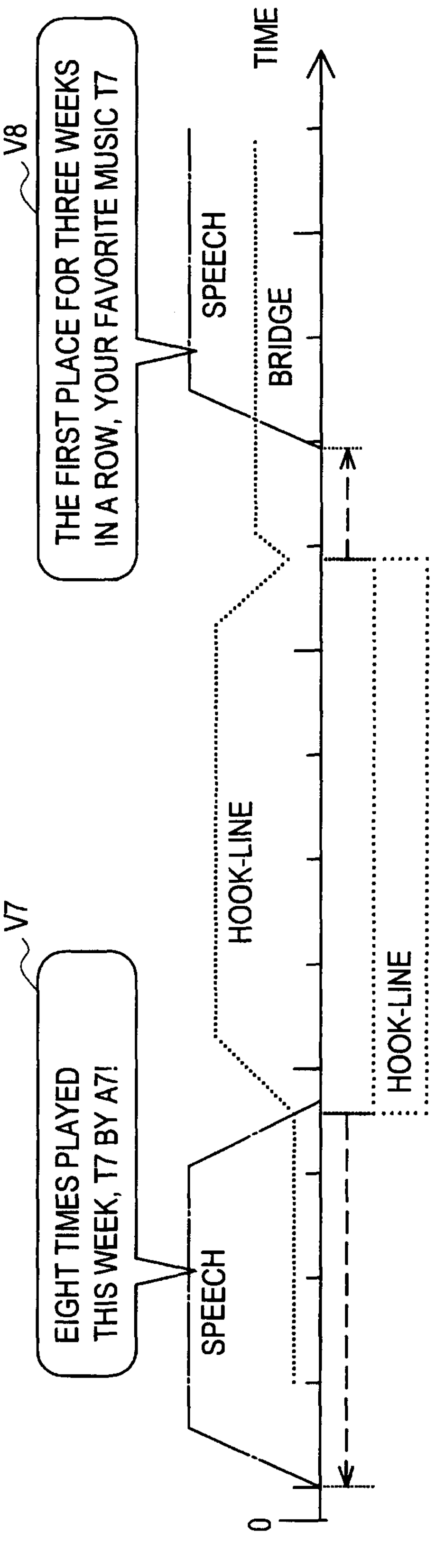
FIG. 19 is an explanatory view which illustrates an example of a speech corresponding to a fourth theme.

FIG. 19 is an explanatory view illustrating an example of the speech corresponding to the fourth theme.

With reference to FIG. 19, the speech V7 of "eight times played this week, T7 by A7!" is synthesized based on the template TP7 of FIG. 18. Further, the output time point of the speech V7 is determined at ten seconds before the top of the time period of the hook-line indicated by the music progression data based on the timing data TM7. Accordingly, the countdown-like speech on the reproduction number ranking for each user or for the speech processing apparatus 100 is output as "eight times played this week, T7 by A7!" immediately before the hook-line is performed.

Similarly, a speech V8 of "the first place for three weeks in a row, your favorite music T7" is synthesized based on the template TP8 of FIG. 18. Further, the output time point of the speech V8 is determined at two seconds after the tail of the time period of the hook-line indicated by the music progression data based on the timing data TM8. Accordingly, the countdown-like speech on the reproduction number ranking is output as "the first place for three weeks in a row, your favorite music T7" immediately after the hook-line ends.

In the present embodiment, the music processing unit 270 may extract and output a part of the music containing the hook-line to the audio output unit 180 instead of outputting the entire music to the audio output unit 180, as well. In this case, the speech output time point determined by the timing determining unit 130 is possibly moved in accordance with the part extracted by the music processing unit 270.

4-3. Conclusion of Second Embodiment

Up to this point, the speech processing apparatus 200 according to the second embodiment of the present invention has been described with reference to FIGS. 17 to 19. According to the present embodiment, an output time point of a speech to be output during music reproducing is dynamically determined by utilizing music progression data defining properties of one or more time points or one or more time periods along music progression, as well. Then, the speech content output during music reproducing may contain an attribute value set based on music reproduction history. Accordingly, the variety of speeches being possibly output at various time points along music progression is enhanced.

Further, with the above fourth theme ("personal countdown"), countdown-like music introduction on reproduction number ranking can be performed for music reproduced by a user or a system. Accordingly, since different speeches are provided to users having the same music group when reproduction tendencies are different, it is expected to further improve the entertainment property to be experienced by a user.

5. Description of Third Embodiment

In an example described as the third embodiment of the present invention, the variety of speeches to be output is enhanced with cooperation among plural users (or plural apparatuses) by utilizing the music reproduction history logged by the history logging unit 272 of the second embodiment.

5-1. Configuration Example of Speech Processing Apparatus

Figure 20:
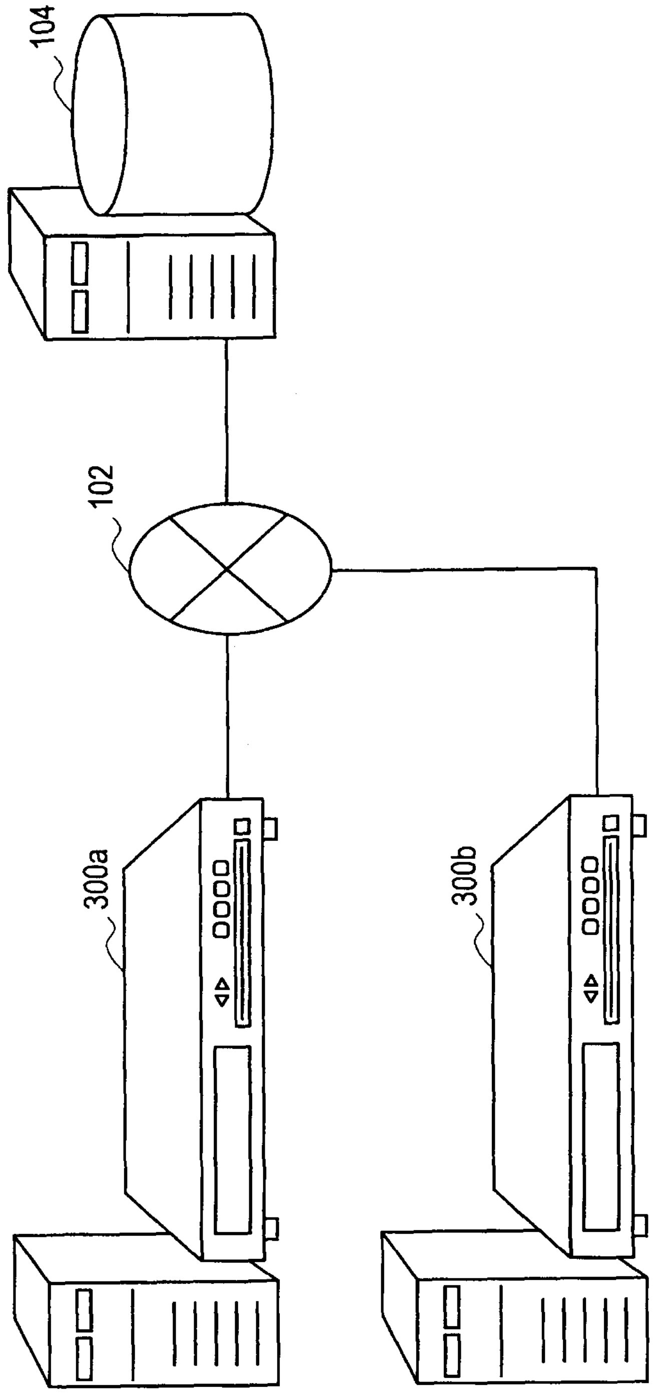
FIG. 20 is a schematic view which illustrates an outline of a speech processing apparatus according to a third embodiment.

FIG. 20 is a schematic view illustrating an outline of a speech processing apparatus 300 according to the third embodiment of the present invention. FIG. 20 illustrates a speech processing apparatus 300*a*, a speech processing apparatus 300*b*, the network 102 and the external database 104.

The speech processing apparatuses 300*a* and 300*b* are capable of mutually communicating via the network 102. The speech processing apparatuses 300*a* and 300*b* are examples of the speech processing apparatus of the present embodiment and may be an information processing apparatus, a digital household electrical appliance, a car navigation device or the like, as similar to the speech processing apparatus 100 according to the first embodiment. In the following, the speech processing apparatuses 300*a* and 300*b* are collectively called the speech processing apparatus 300.

Figure 21:
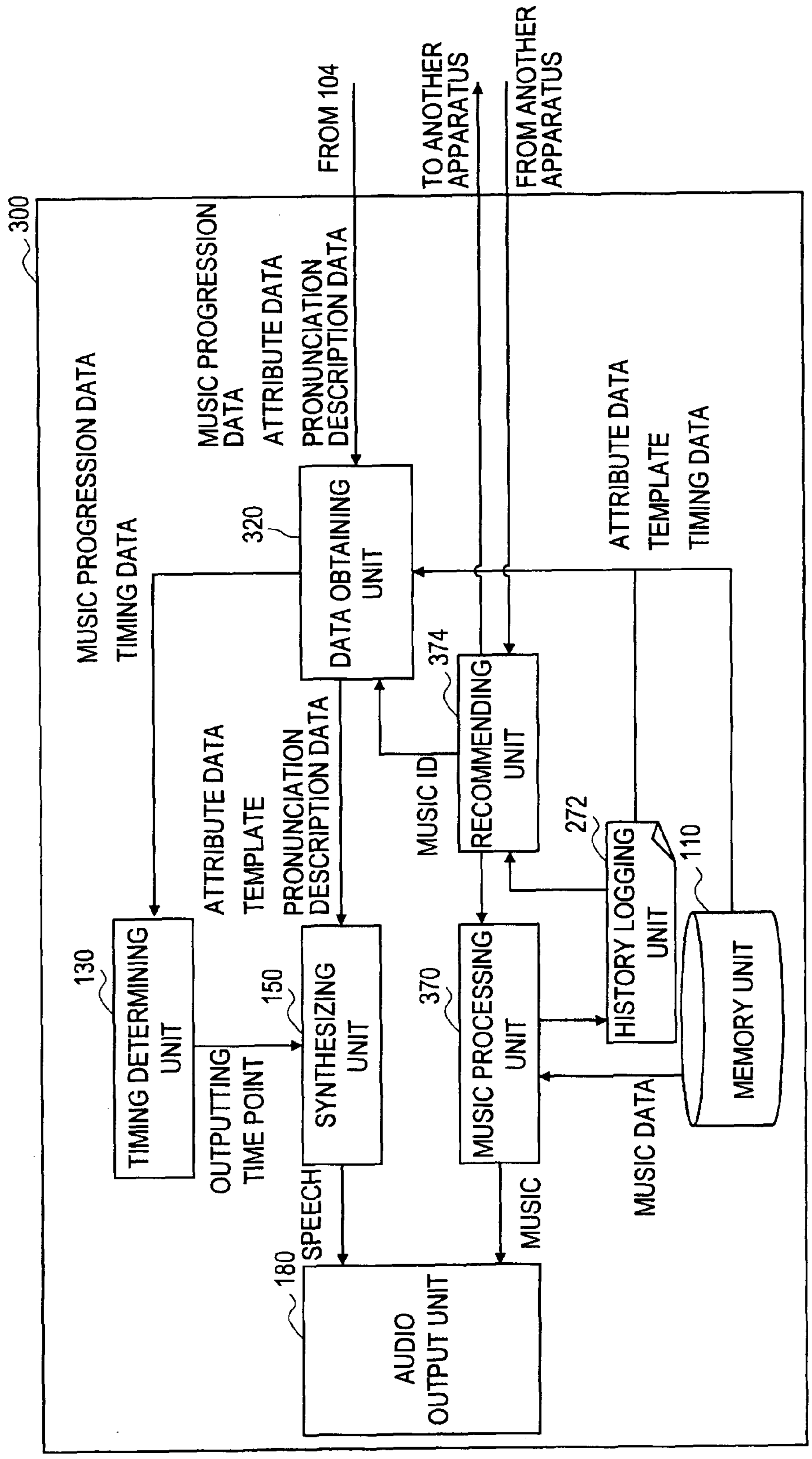
FIG. 21 is a block diagram which illustrates an example of the configuration of a speech processing apparatus according to a third embodiment.

FIG. 21 is a block diagram illustrating an example of the configuration of the speech processing apparatus 300 according to the present embodiment. As illustrated in FIG. 21, the speech processing apparatus 300 includes the memory unit 110, a data obtaining unit 320, the timing determining unit 130, the synthesizing unit 150, a music processing unit 370, the history logging unit 272, a recommending unit 374 and the audio output unit 180.

Similar to the data obtaining unit 220 according to the second embodiment, the data obtaining unit 320 obtains data to be used by the timing determining unit 130 or the synthesizing unit 150 from the memory unit 110, the external database 104 or the history logging unit 272. Further, in the present embodiment, when a music ID to uniquely identify music recommended by the later-mentioned recommending unit 374 is input, the data obtaining unit 320 obtains attribute data relating to the music ID from the external database 104 and the like and outputs to the synthesizing unit 150. Accordingly, the synthesizing unit 150 becomes capable of inserting the attribute value relating to the recommended music to a predetermined position of text data contained in a template.

Similar to the music processing unit 270 according to the second embodiment, the music processing unit 370 obtains music data from the memory unit 110 to reproduce the music and generates an audio signal by performing processes such as stream unbundling and decoding. Further, the music processing unit 370 outputs music reproduction history to the history logging unit 272. Further, in the present embodiment, when music is recommended by the recommending unit 374, the music processing unit 370 obtains music data of the recommended music from the memory unit 110 (or another source which is not illustrated), for example, and performs a process such as generating the above audio signals.

The recommending unit 374 determines music to be recommended to a user of the speech processing apparatus 300 based on the music reproduction history logged by the history logging unit 272 and outputs a music ID to uniquely specify the music to the data obtaining unit 320 and the music processing unit 370. For example, the recommending unit 374 may determine, as the music to be recommended, other music by the artist of the music having large number of reproduction among the music reproduction history logged by the history logging unit 272. Further, for example, the recommending unit 374 may determine the music to be recommended by exchanging the music reproduction history with another speech processing apparatus 300 and by utilizing a method such as contents based filtering (CBF) and collaborative filtering (CF). Further, the recommending unit 374 may obtain information of new music via the network 102 and determine the new music as the music to be recommended. In addition, the recommending unit 374 may transmit the reproduction history data logged by the own history logging unit 272 or the music ID of the recommended music to another speech processing apparatus 300 via the network 102.

The configuration of the speech processing apparatus 300 enables to output a speech based on the fifth theme as described in the following.

5-2. Example of Theme (Fifth Theme: Recommendation)

Figure 22:
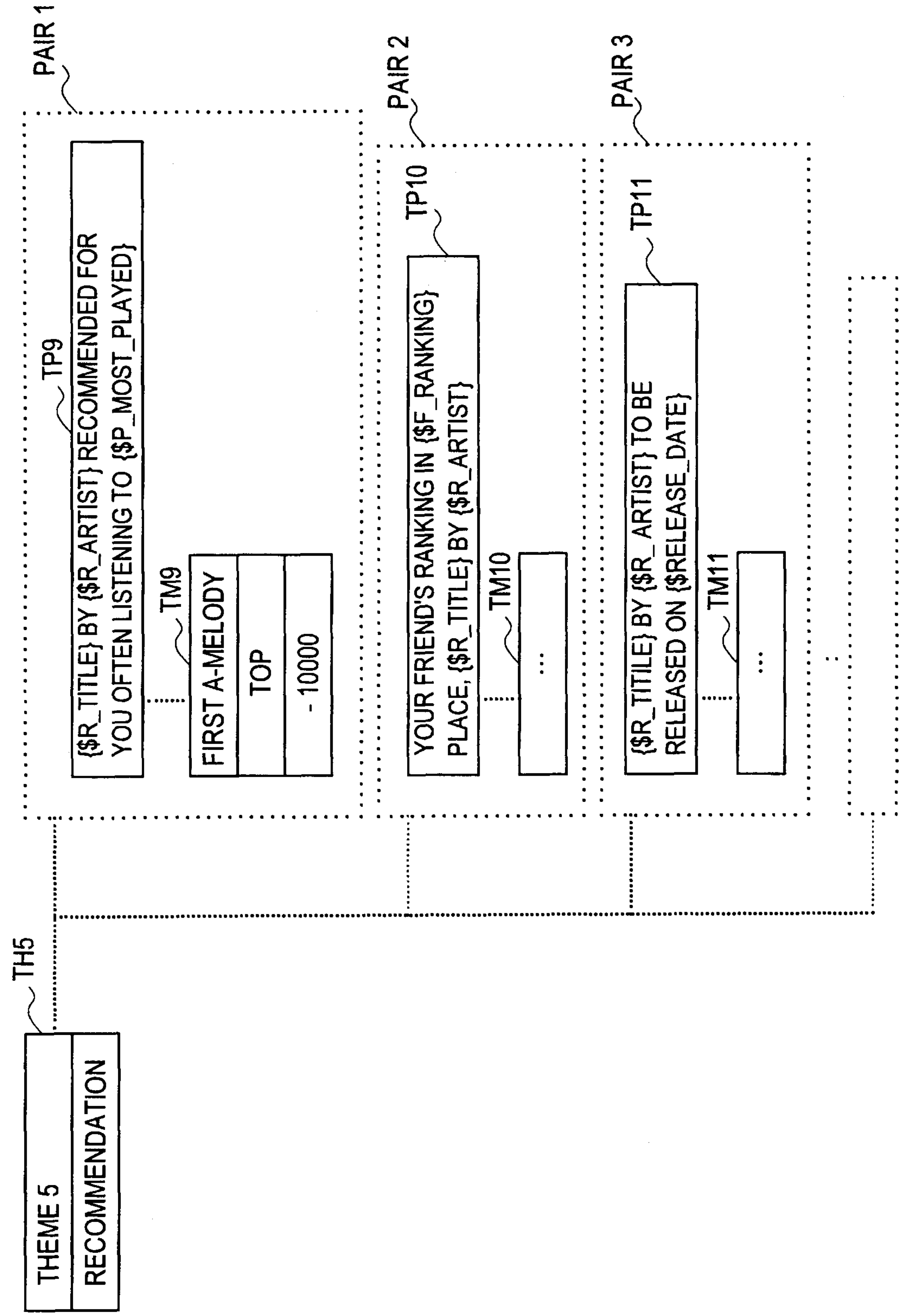
FIG. 22 is an explanatory view which illustrates an example of a template and timing data belonging to a fifth theme.

FIG. 22 is an explanatory view illustrating an example of a template and timing data belonging to the fifth theme. With reference to FIG. 22, plural pairs of a templates and timing data (i.e., pair 1, pair 2, pair 3 . . . ) are associated with the theme data TH5 having data items as the theme ID is "theme 5" and the theme name is "recommendation".

Pair 1 contains a template TP9 and timing data TM9. The template TP9 contains text data of "${R_TITLE} by ${R_ARTIST} recommended for you often listening to ${P_MOST_PLAYED}". Here, "${P_MOST_PLAYED}" in the text data is a symbol indicating a position where a title of the music having the largest number of reproduction times in the music reproduction history logged by the history logging unit 272, for example. "${R_TITLE}" and "${R_ARTIST}" are symbols respectively indicating positions where the artist name and title of the music recommended by the recommending unit 374 are inserted. Further, as respective data values of the timing data TM9 corresponding to the template TP9, the type is "first A-melody", the alignment is "top", and the offset is "−10000".

Meanwhile, pair 2 contains a template TP10 and timing data TM10. The template TP10 contains text data of "your friend's ranking in ${F_RANKING} place, ${R_TITLE} by ${R_ARTIST}". Here, "${F_RANKING}" in the text data is a symbol indicating a position where a numeric value denoting an ordinal position of the music recommended by the recommending unit 374 is inserted among the music reproduction history received by the recommending unit 374 from the other speech processing apparatus 300.

Further, pair 3 contains a template TP11 and timing data TM11. The template TP11 contains text data of "${R_TITILE} by $ {R_ARTIST} to be released on ${RELEASE_DATE}". Here, "${RELEASE_DATE}" in the text data is a symbol indicating a position where a release date of the music recommended by the recommending unit 374 is to be inserted, for example.

Figure 23:
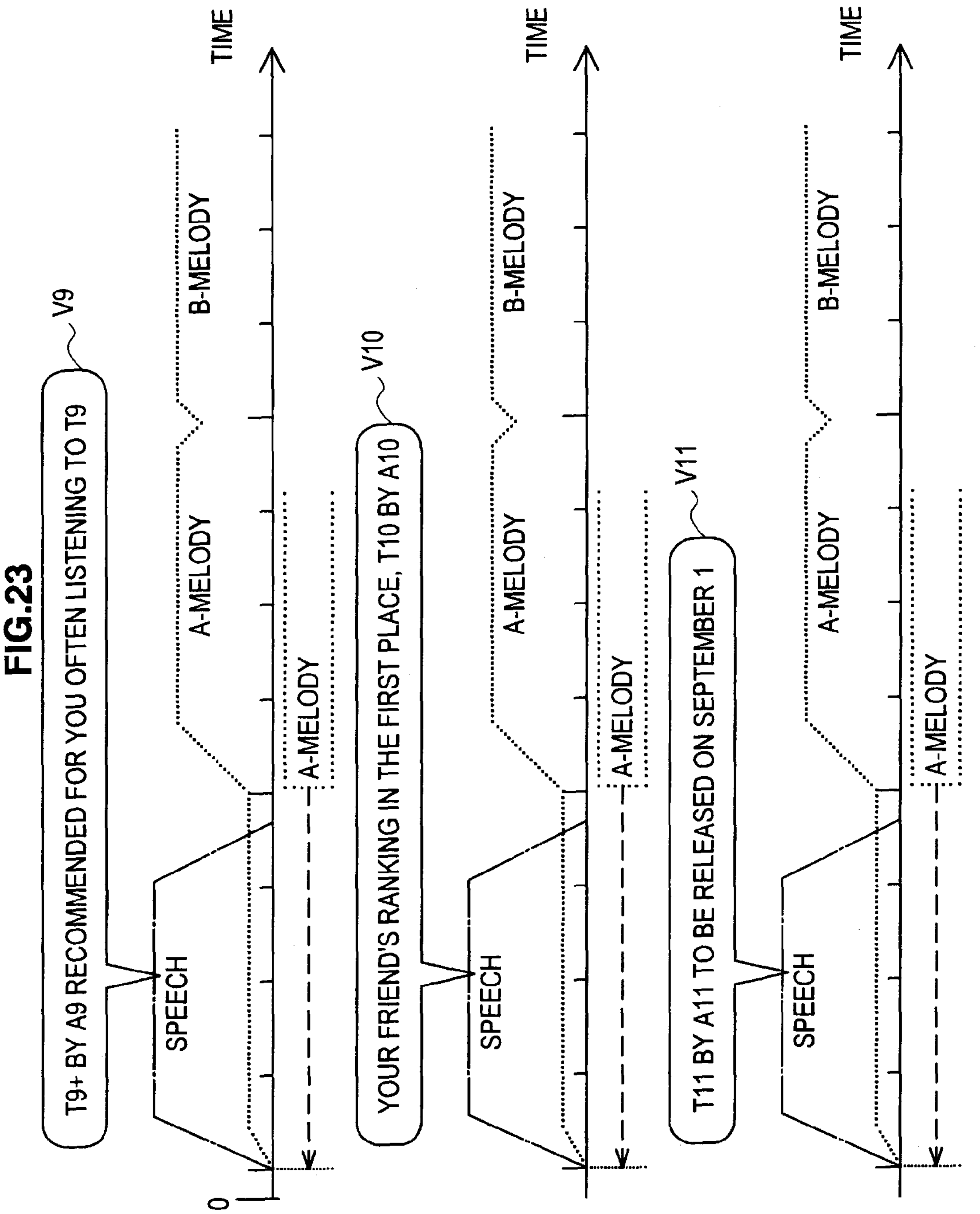
FIG. 23 is an explanatory view which illustrates an example of a speech corresponding to a fifth theme.

FIG. 23 is an explanatory view illustrating an example of a speech corresponding to the fifth theme.

With reference to FIG. 23, a speech V9 of "T9+ by A9 recommended for you often listening to T9" is synthesized based on the template TP9 of FIG. 22. Further, the output time point of the speech V9 is determined at ten seconds before the top of the time period of the first A-melody indicated by the music progression data based on the timing data TM9. Accordingly, the speech V9 to introduce the recommended music is output immediately before performing the first A-melody of the music.

Similarly, a speech V10 of "your friend's ranking in the first place, T10 by A10" is synthesized based on the template TP10 of FIG. 22. The output time point of the speech V10 is also determined at ten seconds before the top of the time period of the first A-melody indicated by the music progression data.

Similarly, a speech V11 of "T11 by A11 to be released on September 1" is synthesized based on the template TP11 of FIG. 22. The output time point of the speech V11 is also determined at ten seconds before the top of the time period of the first A-melody indicated by the music progression data.

In the present embodiment, the music processing unit 370 may extract and output only a part of the music containing from the first A-melody until the first hook-line (i.e., sometimes called "the first line" of the music) to the audio output unit 180 instead of outputting the entire music to the audio output unit 180.

5-3. Conclusion of Third Embodiment

Up to this point, the speech processing apparatus 300 according to the third embodiment of the present invention has been described with reference to FIGS. 20 to 23. According to the present embodiment, an output time point of a speech to be output during music reproducing is dynamically determined by utilizing music progression data defining properties of one or more time points or one or more time periods along music progression, as well. Then, the speech content output during music reproducing may contain an attribute value relating to the recommended music based on reproduction history data of a listener (listening user) of the music or a user being different from the listener. Accordingly, quality of user's experience can be further improved such as promotion of encountering to new music by reproducing unexpected music being different from the music to be reproduced with an ordinary playlist along with introduction of the music.

Figure 24:
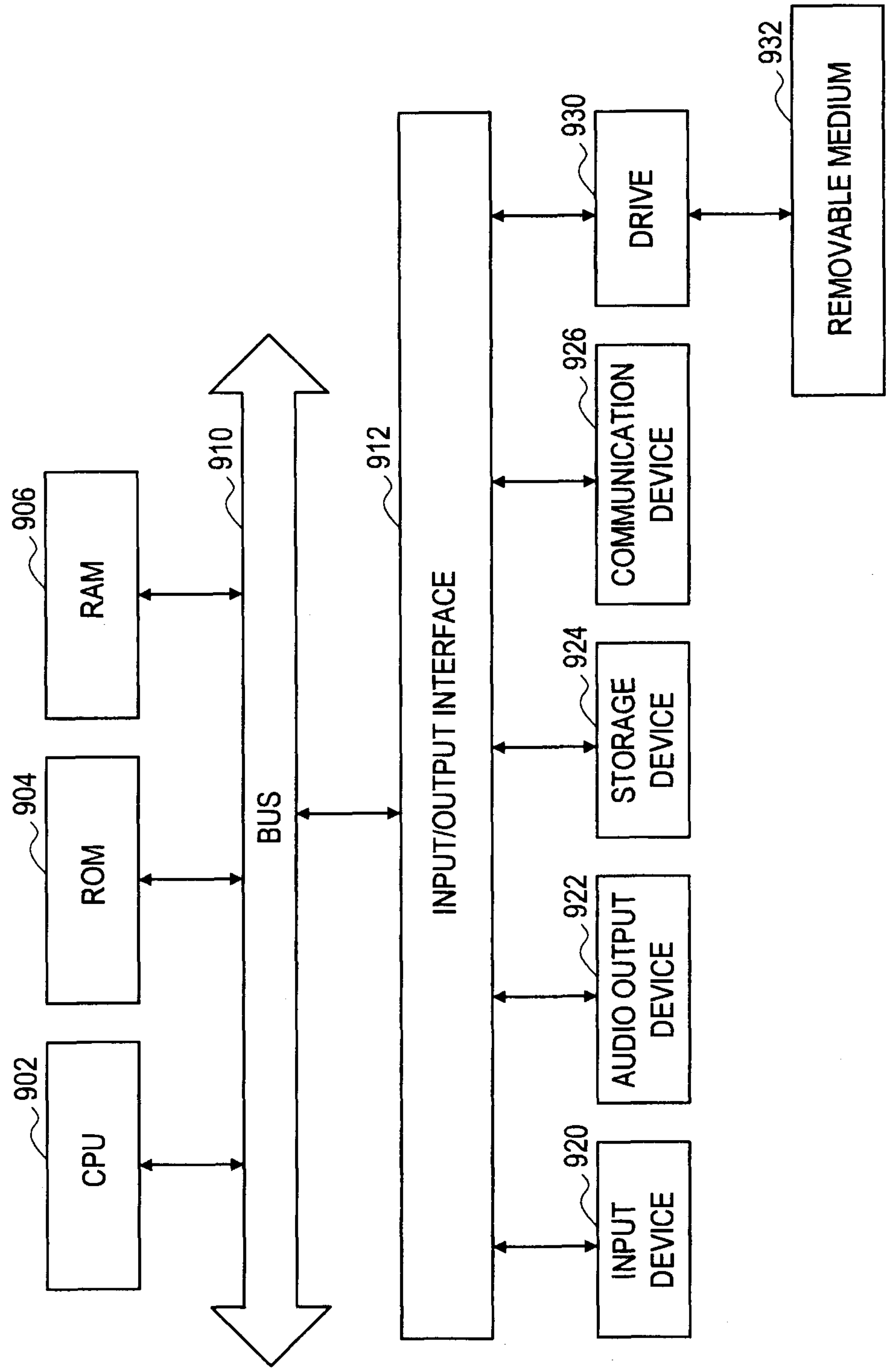
FIG. 24 is a block diagram which illustrates an example of a hardware configuration of a speech processing apparatus according to an embodiment of the present invention.

Here, the speech processing apparatuses 100, 200, or 300 described in the present specification may be implemented as the apparatus having the hardware configuration as illustrated in FIG. 24, for example.

In FIG. 24, a CPU 902 controls overall operation of the hardware. A read only memory (ROM) 904 stores a program or data describing a part or all of series of processes. A random access memory (RAM) 906 temporally stores a program, data and the like to be used by the CPU 902 during performing a process.

The CPU 902, the ROM 904 and the RAM 906 are mutually connected via a bus 910. The bus 910 is further connected to an input/output interface 912. The input/output interface 912 is the interface to connect the CPU 902, the ROM 904 and the RAM 906 to an input device 920, an audio output device 922, a storage device 924, a communication device 926 and a drive 930.

The input device 920 receives an input of an instruction and information from a user (for example, theme specification) via a user interface such as a button, a switch, a lever, a mouse and a keyboard. The audio output device 922 corresponds to a speaker and the like, for example, and is utilized for music reproducing and speech outputting.

The storage device 924 is constituted with a hard disk, a semiconductor memory or the like, for example, and stores programs and various data. The communication device 926 supports a communication process with the external database 104 or another device via the network 102. The drive 930 is arranged as required and a removable medium 932 may be mounted to the drive 930, for example.

It should be understood by those skilled in the art that various modifications, combinations, sub-combinations and alterations may occur depending on design requirements and other factors insofar as they are within the scope of the appended claims or the equivalents thereof.

For example, the speech processing described with reference to FIG. 11 is not necessarily performed along the order described in the flowchart. Respective processing steps may include a process performed concurrently or separately.

The present application contains subject matter related to that disclosed in Japanese Priority Patent Application JP 2009-192399 filed in the Japan Patent Office on Aug. 21, 2009, the entire content of which is hereby incorporated by reference.

What is claimed is:

1. A speech processing apparatus comprising:

a data obtaining unit configured to obtain music progression data defining a property of one or more time points or one or more time periods along progression of music;

a timing determining unit configured to determine an output time point at which a speech is to be output during reproducing the music by utilizing the music progression data obtained by the data obtaining unit; and an audio output unit configured to output the speech at the output time point determined by the timing determining unit during reproducing the music;

wherein the data obtaining unit is further configured to obtain timing data which defines output timing of the speech, including an offset based on the music progression data, in association with any one of the one or more time points or the one or more time periods having a property defined by the music progression data, and the timing determining unit is further configured to determine the output time point by utilizing the music progression data and the timing data.

2. The speech processing apparatus according to claim 1, wherein the data obtaining unit is further configured to obtain a template which defines content of the speech, and the speech processing apparatus further comprising:

a synthesizing unit configured to synthesize the speech by utilizing the template obtained by the data obtaining unit.

3. The speech processing apparatus according to claim 2, wherein the template contains text data describing the content of the speech in a text format, and the text data has a specific symbol which indicates a position where an attribute value of the music is to be inserted.

4. The speech processing apparatus according to claim 3, wherein the data obtaining unit is further configured to obtain attribute data indicating an attribute value of the music, and the synthesizing unit is further configured to synthesize the speech by utilizing the text data contained in the template after an attribute value of the music is inserted to a position indicated by the specific symbol in accordance with the attribute data obtained by the data obtaining unit.

5. The speech processing apparatus according to claim 2, further comprising:

a memory unit configured to store a plurality of the templates defined being associated respectively with any one of a plurality of themes relating to music reproduction, wherein the data obtaining unit is further configured to obtain one or more template corresponding to a specified theme from the plurality of templates stored at the memory unit.

6. The speech processing apparatus according to claim 3, wherein at least one of the templates contains the text data to which a title or an artist name of the music is inserted as the attribute value.

7. The speech processing apparatus according to claim 3, wherein at least one of the templates contains the text data to which the attribute value relating to ranking of the music is inserted.

8. The speech processing apparatus according to claim 3, further comprising:

a history logging unit configured to log a history of music reproduction, wherein at least one of the templates contains the text data to which the attribute value being set based on the history logged by the history logging unit is inserted.

9. The speech processing apparatus according to claim 3, wherein at least one of the templates contains the text data to which an attribute value being set based on music reproduction history of a listener of the music or a user being different from the listener is inserted.

10. The speech processing apparatus according to claim 1, wherein the property of one or more time points or one or more time periods defined by the music progression data contains at least one of presence of singing, a type of melody, presence of a beat, a type of a code, a type of a key and a type of a played instrument at the time point or the time period.

11. A speech processing method utilizing a speech processing apparatus, comprising the steps of:

obtaining music progression data which defines a property of one or more time points or one or more time periods along progression of music from a storage medium arranged at the inside or outside of the speech processing apparatus;

determining, using a timing determining unit, an output time point at which a speech is to be output during reproducing the music by utilizing the obtained music progression data; and outputting, using an audio output unit, the speech at the determined output time point during reproducing the music;

wherein the obtaining music progression data includes obtaining timing data which defines output timing of the speech, including an offset based on the music progression data, in association with any one of the one or more time points or the one or more time periods having a property defined by the music progression data, and wherein the determining an output time point includes determining the output time point by utilizing the music progression data and the timing data.

12. A non-transitory computer-readable storage medium having stored thereon a program comprising software code which, when executed by a processor of a computer, causes a computer controlling a speech processing apparatus to function as:

a data obtaining unit which obtains music progression data defining a property of one or more time points or one or more time periods along progression of music;

a timing determining unit which determines an output time point at which a speech is to be output during reproducing the music by utilizing the music progression data obtained by the data obtaining unit; and an audio output unit which outputs the speech at the output time point determined by the timing determining unit during reproducing the music;

wherein the data obtaining unit further obtains timing data which defines output timing of the speech, including an offset based on the music progression data, in association with any one of the one or more time points or the one or more time periods having a property defined by the music progression data, and the timing determining unit determines the output time point by utilizing the music progression data and the timing data.

* * * * *